United States Patent
Lopez-Perez et al.

(10) Patent No.: US 12,451,930 B2
(45) Date of Patent: Oct. 21, 2025

(54) COOPERATIVE BEAMFORMING IN WIRELESS NETWORK

(71) Applicant: Nokia Technologies Oy, Espoo (FI)

(72) Inventors: David Lopez-Perez, Blanchardstown (IE); Adrian Garcia Rodriguez, Santa Cruz de Tenerife (ES); Mika Kasslin, Espoo (FI); Lorenzo Galati Giordano, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 350 days.

(21) Appl. No.: 17/299,687

(22) PCT Filed: Jan. 11, 2019

(86) PCT No.: PCT/FI2019/050019
§ 371 (c)(1),
(2) Date: Jun. 3, 2021

(87) PCT Pub. No.: WO2020/144393
PCT Pub. Date: Jul. 16, 2020

(65) Prior Publication Data
US 2022/0038140 A1    Feb. 3, 2022

(51) Int. Cl.
*H04B 7/026* (2017.01)
*H04B 7/06* (2006.01)

(52) U.S. Cl.
CPC .......... *H04B 7/026* (2013.01); *H04B 7/0617* (2013.01); *H04B 7/0626* (2013.01)

(58) Field of Classification Search
CPC ........ H04B 7/026; H04B 7/06; H04B 7/0617; H04W 74/08; H04W 72/04
See application file for complete search history.

(56) References Cited

U.S. PATENT DOCUMENTS 6,999,796 B2 * 2/2006 Tiirola .................. H04B 7/086
  342/422
8,576,765 B2 * 11/2013 Shimada .............. H04B 7/0413
  370/315

(Continued)

FOREIGN PATENT DOCUMENTS

CN    101765116 A    6/2010
CN    104782059 A    7/2015

(Continued)

OTHER PUBLICATIONS

Cariou et al., "EXtreme Throughput (XT) 802.11", Doc.: IEEE 802.11-18/0789r10, Intel, May 8, 2018, pp. 1-15.

(Continued)

*Primary Examiner* — Berhanu Tadese
(74) *Attorney, Agent, or Firm* — Nokia Technologies Oy

(57) ABSTRACT

This document discloses a solution for performing inter-network beamforming cooperation. According to an aspect, a method comprises: establishing, by a first access node of a first wireless network, inter-network beamforming with a second access node of a second wireless network and acquiring, during the establishment, information indicating that at least one station of the second wireless network has added an identifier of the first access node to a beamforming address set; transmitting, by the first access node, an announcement frame indicating the at least one station of the second wireless network; transmitting, by the first access node, a channel sounding signal; receiving, by the first access node, a beamforming report comprising channel state information from the at least one station of the second wireless network; and performing, by the first access node, null steering beamforming transmission in the first wireless network on the basis of the received channel state information.

13 Claims, 8 Drawing Sheets

(56) References Cited

U.S. PATENT DOCUMENTS

| | | | | |
|---|---|---|---|---|
| 8,711,821 B2* | 4/2014 | Grandhi | H04B 7/0623 370/254 |
| 8,767,570 B2* | 7/2014 | Ong | H04W 74/0816 370/252 |
| 8,923,146 B2* | 12/2014 | Ong | H04W 28/26 370/312 |
| 9,042,362 B2* | 5/2015 | Grandhi | H04W 24/10 370/338 |
| 9,066,265 B2* | 6/2015 | Park | H04W 28/16 |
| 9,077,498 B2* | 7/2015 | Abraham | H04B 7/0626 |
| 9,100,154 B1* | 8/2015 | Jeffery | H04L 5/0033 |
| 9,107,229 B2* | 8/2015 | Choudhury | H04W 72/543 |
| 9,179,455 B2* | 11/2015 | Park | H04W 72/12 |
| 9,204,371 B2* | 12/2015 | Liu | H04W 74/0875 |
| 9,220,114 B2* | 12/2015 | Liu | H04W 74/02 |
| 9,232,361 B2* | 1/2016 | Calcev | H04L 12/189 |
| 9,306,645 B2* | 4/2016 | Zhang | H04B 7/0621 |
| 9,344,963 B2* | 5/2016 | Seok | H04W 84/12 |
| 9,351,250 B2* | 5/2016 | Jafarian | H04W 52/0216 |
| 9,351,297 B2* | 5/2016 | Aboul-Magd | H04W 72/27 |
| 9,370,022 B2* | 6/2016 | Kim | H04W 52/0209 |
| 9,374,146 B2* | 6/2016 | Grandhi | H04B 7/0617 |
| 9,374,193 B2* | 6/2016 | Abraham | H04B 7/0636 |
| 9,491,700 B2* | 11/2016 | Choi | H04W 52/0225 |
| 9,504,032 B2* | 11/2016 | Wang | H04W 74/08 |
| 9,538,470 B2* | 1/2017 | Choi | H04W 52/0216 |
| 9,544,849 B2* | 1/2017 | Choi | H04W 52/0229 |
| 9,572,105 B2* | 2/2017 | Wong | H04W 52/0225 |
| 9,585,165 B2* | 2/2017 | Seok | H04W 74/08 |
| 9,591,575 B2* | 3/2017 | Park | H04L 5/006 |
| 9,596,651 B2* | 3/2017 | Jafarian | H04W 52/0216 |
| 9,609,090 B2* | 3/2017 | Lee | H04L 69/22 |
| 9,615,286 B2* | 4/2017 | Choi | H04W 74/006 |
| 9,622,266 B2* | 4/2017 | Kneckt | H04W 74/0816 |
| 9,628,999 B2* | 4/2017 | Aboul-Magd | H04B 7/024 |
| 9,641,234 B2* | 5/2017 | Moon | H04L 69/22 |
| 9,647,743 B2* | 5/2017 | Grandhi | H04W 84/12 |
| 9,673,943 B2* | 6/2017 | Seok | H04L 27/2613 |
| 9,698,918 B2* | 7/2017 | Hedayat | H04W 74/0808 |
| 9,699,685 B1* | 7/2017 | Zhou | G01R 31/371 |
| 9,723,623 B2* | 8/2017 | Zhou | H04W 72/121 |
| 9,729,368 B2* | 8/2017 | Suh | H04L 27/26025 |
| 9,730,159 B2* | 8/2017 | Choi | H04W 52/0216 |
| 9,736,855 B2* | 8/2017 | Zhou | H04W 74/04 |
| 9,749,967 B2* | 8/2017 | Wang | H04W 74/0816 |
| 9,775,174 B2* | 9/2017 | Seok | H04W 74/0816 |
| 9,781,615 B2* | 10/2017 | You | H04W 24/06 |
| 9,781,741 B2* | 10/2017 | Kwon | H04W 72/23 |
| 9,794,878 B2* | 10/2017 | Choi | H04W 4/70 |
| 9,801,184 B2* | 10/2017 | Noh | H04W 72/046 |
| 9,801,206 B2* | 10/2017 | Hedayat | H04W 74/006 |
| 9,807,797 B2* | 10/2017 | Cheong | H04B 7/0695 |
| 9,813,135 B2* | 11/2017 | Abraham | H04B 7/0658 |
| 9,820,162 B2* | 11/2017 | Wang | H04W 16/14 |
| 9,825,683 B2* | 11/2017 | Abraham | H04L 5/0057 |
| 9,838,090 B2* | 12/2017 | Lee | H04L 1/1685 |
| 9,839,047 B2* | 12/2017 | Kwon | H04L 25/0224 |
| 9,854,453 B2* | 12/2017 | Wang | H04W 72/046 |
| 9,854,469 B2* | 12/2017 | Wang | H04W 28/0278 |
| 9,854,606 B2* | 12/2017 | Seok | H04W 74/04 |
| 9,877,276 B2* | 1/2018 | Seok | H04W 52/0206 |
| 9,882,614 B2* | 1/2018 | Murakami | H04B 7/0456 |
| 9,882,624 B2* | 1/2018 | Abraham | H04L 1/0079 |
| 9,887,821 B2* | 2/2018 | Seok | H04W 52/0229 |
| 9,893,790 B2* | 2/2018 | Moon | H04B 7/0452 |
| 9,894,607 B2* | 2/2018 | Choi | H04W 28/0221 |
| 9,917,679 B2* | 3/2018 | Seok | H04L 1/0041 |
| 9,918,342 B2* | 3/2018 | Seok | H04W 74/0816 |
| 9,923,702 B2* | 3/2018 | Wang | H04L 5/0073 |
| 9,929,847 B2* | 3/2018 | Asterjadhi | H04W 72/04 |
| 9,942,925 B2* | 4/2018 | Merlin | H04W 74/0816 |
| 9,942,943 B2* | 4/2018 | Ryu | H04W 28/021 |
| 9,967,827 B2* | 5/2018 | Rong | H04W 52/06 |
| 9,973,353 B2* | 5/2018 | Park | H04B 7/0413 |
| 10,021,650 B2* | 7/2018 | Wong | H04L 49/201 |
| 10,021,694 B2* | 7/2018 | Noh | H04W 74/0816 |
| 10,028,272 B2* | 7/2018 | Seok | H04W 40/244 |
| 10,034,245 B2* | 7/2018 | Wang | H04W 74/08 |
| 10,045,299 B2* | 8/2018 | Atefi | H04B 17/318 |
| 10,045,349 B2* | 8/2018 | Atefi | H04L 69/22 |
| 10,045,385 B2* | 8/2018 | Grandhi | H04W 28/18 |
| 10,051,588 B2* | 8/2018 | Wang | H04W 56/001 |
| 10,051,640 B2* | 8/2018 | Seok | H04B 7/024 |
| 10,057,770 B2* | 8/2018 | Soundararajan | H04L 63/0876 |
| 10,057,854 B2* | 8/2018 | Ghosh | H04W 52/0229 |
| 10,057,884 B2* | 8/2018 | Atefi | H04L 69/22 |
| 10,057,908 B2* | 8/2018 | Sutskover | H04L 5/0007 |
| 10,075,269 B2* | 9/2018 | Chun | H04L 5/0007 |
| 10,075,274 B2* | 9/2018 | Wilhelmsson | H04W 72/23 |
| 10,085,258 B2* | 9/2018 | Yu | H04W 72/0453 |
| 10,090,982 B2* | 10/2018 | Abraham | H04L 5/0053 |
| 10,091,813 B2* | 10/2018 | Wang | H04W 56/0005 |
| 10,104,681 B2* | 10/2018 | Janis | H04W 72/542 |
| 10,104,688 B2* | 10/2018 | Seok | H04W 74/04 |
| 10,110,289 B2* | 10/2018 | Zhang | H04B 7/0621 |
| 10,111,185 B2* | 10/2018 | Chu | H04W 72/0473 |
| 10,123,266 B2* | 11/2018 | Wang | H04W 52/0206 |
| 10,123,331 B2* | 11/2018 | Park | H04L 5/006 |
| 10,128,925 B2* | 11/2018 | Chun | H04L 1/0643 |
| 10,128,966 B1* | 11/2018 | Chu | H04B 17/318 |
| 10,135,651 B2* | 11/2018 | Hedayat | H04L 27/26 |
| 10,148,404 B2* | 12/2018 | Huang | H04L 27/2613 |
| 10,154,482 B2* | 12/2018 | Kim | H04W 74/006 |
| 10,154,520 B1* | 12/2018 | Hedayat | H04W 74/06 |
| 10,158,402 B2* | 12/2018 | Murakami | H04L 27/2613 |
| 10,181,996 B2* | 1/2019 | Huang | H04W 74/02 |
| 10,205,570 B2* | 2/2019 | Park | H04L 5/0048 |
| 10,225,124 B2* | 3/2019 | Lee | H04L 5/0007 |
| 10,231,215 B2* | 3/2019 | Chun | H04B 7/063 |
| 10,257,857 B2* | 4/2019 | Noh | H04W 72/23 |
| 10,277,442 B2* | 4/2019 | Kim | H04L 27/2613 |
| 10,278,172 B2* | 4/2019 | Chun | H04L 27/2602 |
| 10,292,161 B2* | 5/2019 | Ryu | H04W 74/0891 |
| 10,298,304 B2* | 5/2019 | Lim | H04B 7/066 |
| 10,299,261 B2* | 5/2019 | Chun | H04L 1/1614 |
| 10,305,552 B2* | 5/2019 | Park | H04W 72/0453 |
| 10,313,169 B2* | 6/2019 | Suh | H04L 27/2603 |
| 10,320,529 B2* | 6/2019 | Chun | H04L 69/10 |
| 10,320,601 B2* | 6/2019 | Lee | H04L 27/2691 |
| 10,321,405 B2* | 6/2019 | Atefi | H04W 52/0245 |
| 10,321,473 B2* | 6/2019 | Kim | H04W 72/20 |
| 10,334,007 B2* | 6/2019 | Chun | H04L 1/1685 |
| 10,349,388 B2* | 7/2019 | Chun | H04L 5/0053 |
| 10,349,445 B2* | 7/2019 | Kim | H04W 74/04 |
| 10,356,756 B2* | 7/2019 | Choi | H04L 5/0055 |
| 10,375,682 B2* | 8/2019 | Cheong | H04W 72/23 |
| 10,397,035 B2* | 8/2019 | Lee | H04L 27/26136 |
| 10,397,955 B2* | 8/2019 | Park | H04W 74/002 |
| 10,405,338 B2* | 9/2019 | Chun | H04L 5/0091 |
| 10,412,744 B2* | 9/2019 | Chun | H04L 1/0061 |
| 10,412,764 B2* | 9/2019 | Park | H04W 72/0453 |
| 10,412,769 B2* | 9/2019 | Cherian | H04L 25/0224 |
| 10,430,734 B2* | 10/2019 | Kneckt | G06Q 10/06 |
| 10,448,333 B2* | 10/2019 | Kim | H04W 74/06 |
| 10,454,534 B2* | 10/2019 | Lee | H04L 1/00 |
| 10,454,538 B2* | 10/2019 | Vermani | H04L 5/0035 |
| 10,454,650 B2* | 10/2019 | Kim | H04W 52/243 |
| 10,469,230 B2* | 11/2019 | Park | H04L 5/001 |
| 10,470,186 B2* | 11/2019 | Ryu | H04W 72/0453 |
| 10,492,224 B2* | 11/2019 | Kim | H04W 12/06 |
| 10,517,142 B2* | 12/2019 | Kim | H04L 5/0094 |
| 10,524,201 B2* | 12/2019 | Kim | H04W 48/12 |
| 10,524,231 B2* | 12/2019 | Kim | H04L 5/0055 |
| 10,536,932 B2* | 1/2020 | Chun | H04W 72/21 |
| 10,536,937 B2* | 1/2020 | Chun | H04W 72/23 |
| 10,542,525 B2* | 1/2020 | Atefi | H04W 74/0816 |
| 10,548,146 B2* | 1/2020 | Chun | H04W 72/21 |
| 10,560,242 B2* | 2/2020 | Chun | H04L 5/0055 |
| 10,575,249 B2* | 2/2020 | Park | H04W 74/002 |
| 10,575,280 B2* | 2/2020 | Chun | H04L 1/00 |
| 10,616,020 B2* | 4/2020 | Lee | H04L 27/26 |
| 10,616,937 B2* | 4/2020 | Grandhi | H04B 7/0658 |
| 10,623,133 B2* | 4/2020 | Park | H04L 5/00 |
| 10,624,124 B2* | 4/2020 | Huang | H04W 74/02 |

(56) References Cited

U.S. PATENT DOCUMENTS

| | | | | |
|---|---|---|---|---|
| 10,631,334 | B2* | 4/2020 | Kim | H04W 74/08 |
| 10,652,900 | B2* | 5/2020 | Wang | H04B 17/309 |
| 10,673,665 | B2* | 6/2020 | Park | H04L 27/26 |
| 10,681,690 | B2* | 6/2020 | Kim | H04W 74/006 |
| 10,728,799 | B2* | 7/2020 | Chun | H04L 69/04 |
| 10,736,041 | B2* | 8/2020 | Atefi | H04W 52/146 |
| 10,750,395 | B2* | 8/2020 | Zhou | H04W 24/10 |
| 10,764,921 | B2* | 9/2020 | Park | H04W 84/12 |
| 10,785,772 | B2* | 9/2020 | Chun | H04L 1/1671 |
| 10,805,940 | B2* | 10/2020 | Zhou | H04B 7/026 |
| 10,813,061 | B2* | 10/2020 | Fang | H04W 74/006 |
| 10,820,332 | B2* | 10/2020 | Zhou | H04B 7/0413 |
| 10,820,333 | B2* | 10/2020 | Zhou | H04L 5/0073 |
| 10,826,588 | B2* | 11/2020 | Chun | H04L 27/2602 |
| 10,849,162 | B2* | 11/2020 | Park | H04W 74/0816 |
| 10,862,565 | B2* | 12/2020 | Kim | H04B 7/0636 |
| 10,863,545 | B2* | 12/2020 | Kim | H04W 72/0446 |
| 10,932,229 | B2* | 2/2021 | Lou | H04L 5/0055 |
| 10,932,292 | B2* | 2/2021 | Ryu | H04L 27/2602 |
| 11,012,854 | B2* | 5/2021 | Sugaya | H04W 84/12 |
| 11,013,031 | B2* | 5/2021 | Park | H04W 74/002 |
| 11,089,652 | B2* | 8/2021 | Wong | H04W 84/12 |
| 11,102,721 | B2* | 8/2021 | Park | H04W 52/0216 |
| 11,129,163 | B2* | 9/2021 | Ko | H04W 72/0453 |
| 11,139,863 | B2* | 10/2021 | Lee | H04W 48/00 |
| 11,265,913 | B2* | 3/2022 | Zhang | H04W 74/002 |
| 11,277,252 | B2* | 3/2022 | Park | H04L 5/0092 |
| 11,297,679 | B2* | 4/2022 | Lim | H04W 72/0453 |
| 11,304,186 | B2* | 4/2022 | Cheong | H04W 72/21 |
| 11,304,232 | B2* | 4/2022 | Zhang | H04L 5/0094 |
| 11,324,046 | B2* | 5/2022 | Jang | H04L 1/0068 |
| 11,350,457 | B2* | 5/2022 | Park | H04W 72/0453 |
| 2010/0271995 | A1* | 10/2010 | Seok | H04W 52/0219 370/311 |
| 2013/0058239 | A1* | 3/2013 | Wang | H04B 7/0452 370/252 |
| 2014/0362840 | A1* | 12/2014 | Wong | H04L 1/0003 370/338 |
| 2015/0181620 | A1* | 6/2015 | Seok | H04W 74/0816 370/336 |
| 2015/0264710 | A1* | 9/2015 | Kneckt | H04W 72/542 370/336 |
| 2015/0282157 | A1* | 10/2015 | Kim | H04W 72/21 370/329 |
| 2015/0288427 | A1* | 10/2015 | Wang | H04W 72/23 370/329 |
| 2015/0295629 | A1* | 10/2015 | Xia | H04B 7/0695 370/329 |
| 2015/0341807 | A1* | 11/2015 | Jeffery | H04L 5/0033 370/254 |
| 2016/0029226 | A1* | 1/2016 | Aboul-Magd | H04W 16/28 370/329 |
| 2016/0088669 | A1* | 3/2016 | Calcev | H04L 12/2838 370/312 |
| 2016/0119902 | A1* | 4/2016 | Cheong | H04B 17/309 370/329 |
| 2016/0174206 | A1* | 6/2016 | Xia | H04W 16/28 370/329 |
| 2016/0249397 | A1* | 8/2016 | Seok | H04L 1/0075 |
| 2016/0270105 | A1* | 9/2016 | Zhou | H04W 4/70 |
| 2016/0286469 | A1* | 9/2016 | Wang | H04W 48/16 |
| 2016/0301459 | A1* | 10/2016 | Grandhi | H04W 28/18 |
| 2016/0316473 | A1* | 10/2016 | Wang | H04W 24/08 |
| 2016/0329940 | A1* | 11/2016 | Wang | H04L 1/0028 |
| 2016/0330788 | A1* | 11/2016 | Zheng | H04W 28/0205 |
| 2016/0366701 | A1* | 12/2016 | Chu | H04W 74/004 |
| 2017/0055255 | A1* | 2/2017 | Zhou | H04L 5/0055 |
| 2017/0070274 | A1* | 3/2017 | Lim | H04B 7/0617 |
| 2017/0070914 | A1* | 3/2017 | Chun | H04W 4/70 |
| 2017/0079027 | A1* | 3/2017 | Chun | H04W 72/541 |
| 2017/0094685 | A1* | 3/2017 | Noh | H04W 74/0816 |
| 2017/0111924 | A1 | 4/2017 | Josiam et al. | |
| 2017/0118764 | A1* | 4/2017 | Sutskover | H04L 5/0057 |
| 2017/0127269 | A1* | 5/2017 | Ryu | H04W 8/24 |
| 2017/0156148 | A1* | 6/2017 | Park | H04W 72/0453 |
| 2017/0170937 | A1* | 6/2017 | Chun | H04L 5/0094 |
| 2017/0171878 | A1* | 6/2017 | Chun | H04B 7/0452 |
| 2017/0208580 | A1* | 7/2017 | Park | H04L 1/1614 |
| 2017/0208625 | A1* | 7/2017 | Choi | H04W 74/006 |
| 2017/0223665 | A1* | 8/2017 | Chun | H04B 7/0456 |
| 2017/0230963 | A1* | 8/2017 | Park | H04L 5/0091 |
| 2017/0230964 | A1* | 8/2017 | Park | H04W 72/21 |
| 2017/0230981 | A1* | 8/2017 | Ryu | H04W 74/006 |
| 2017/0238286 | A1* | 8/2017 | Chun | H04W 72/21 370/329 |
| 2017/0238310 | A1* | 8/2017 | Huang | H04W 74/02 370/329 |
| 2017/0255659 | A1* | 9/2017 | Cariou | H04B 7/0413 |
| 2017/0257888 | A1* | 9/2017 | Kneckt | H04W 74/0816 |
| 2017/0265130 | A1* | 9/2017 | Kakani | H04W 48/10 |
| 2017/0272295 | A1* | 9/2017 | Lee | H04L 27/26025 |
| 2017/0279864 | A1* | 9/2017 | Chun | H04L 1/1664 |
| 2017/0280383 | A1* | 9/2017 | Park | H04W 4/06 |
| 2017/0280462 | A1* | 9/2017 | Chun | H04W 84/04 |
| 2017/0289987 | A1* | 10/2017 | Seok | H04W 74/06 |
| 2017/0289994 | A1* | 10/2017 | Kim | H04L 5/0007 |
| 2017/0295560 | A1* | 10/2017 | Kim | H04L 5/0055 |
| 2017/0303280 | A1* | 10/2017 | Chun | H04L 5/0094 |
| 2017/0310424 | A1* | 10/2017 | Chun | H04L 69/324 |
| 2017/0311310 | A1* | 10/2017 | Ryu | H04W 88/08 |
| 2017/0325178 | A1* | 11/2017 | Verma | H04W 52/242 |
| 2017/0325202 | A1* | 11/2017 | Verma | H04W 74/04 |
| 2017/0338910 | A1* | 11/2017 | Chun | H04L 1/00 |
| 2017/0339692 | A1* | 11/2017 | Chun | H04L 27/2602 |
| 2017/0353970 | A1* | 12/2017 | Kwon | H04W 72/23 |
| 2017/0366329 | A1* | 12/2017 | Cao | H04W 36/16 |
| 2017/0367078 | A1* | 12/2017 | Chun | H04L 5/0092 |
| 2017/0367096 | A1* | 12/2017 | Park | H04L 1/00 |
| 2017/0367118 | A1* | 12/2017 | Choi | H04W 84/12 |
| 2018/0007661 | A1* | 1/2018 | Chun | H04L 1/00 |
| 2018/0007712 | A1* | 1/2018 | Lou | H04B 7/0452 |
| 2018/0007713 | A1* | 1/2018 | Cheong | H04W 74/08 |
| 2018/0014327 | A1* | 1/2018 | Park | H04W 74/006 |
| 2018/0014334 | A1* | 1/2018 | Ahn | H04W 84/12 |
| 2018/0020410 | A1* | 1/2018 | Park | H04W 52/0235 |
| 2018/0035461 | A1* | 2/2018 | Kim | H04W 84/12 |
| 2018/0084548 | A1* | 3/2018 | Min | H04L 5/0014 |
| 2018/0091347 | A1* | 3/2018 | Lee | H04L 27/26136 |
| 2018/0092127 | A1* | 3/2018 | Park | H04W 72/0453 |
| 2018/0098352 | A1* | 4/2018 | Kim | H04W 74/04 |
| 2018/0110046 | A1* | 4/2018 | Patil | H04W 72/0446 |
| 2018/0115922 | A1* | 4/2018 | Wang | H04W 28/0278 |
| 2018/0115947 | A1* | 4/2018 | Kim | H04W 76/28 |
| 2018/0124746 | A1* | 5/2018 | Choi | H04L 5/0023 |
| 2018/0124806 | A1* | 5/2018 | Kim | H04W 72/0446 |
| 2018/0132175 | A1* | 5/2018 | Choi | H04W 72/12 |
| 2018/0132278 | A1* | 5/2018 | Oteri | H04L 5/0007 |
| 2018/0138959 | A1* | 5/2018 | Chun | H04L 1/06 |
| 2018/0139635 | A1* | 5/2018 | Oteri | H04W 74/0808 |
| 2018/0139699 | A1* | 5/2018 | Choi | H04W 52/0216 |
| 2018/0146426 | A1* | 5/2018 | Park | H04L 27/2603 |
| 2018/0167882 | A1* | 6/2018 | Choi | H04W 74/002 |
| 2018/0167926 | A1* | 6/2018 | Xia | A63F 13/792 |
| 2018/0175990 | A1* | 6/2018 | Seok | H04L 1/00 |
| 2018/0176865 | A1* | 6/2018 | Kim | H04W 74/06 |
| 2018/0176929 | A1* | 6/2018 | Ryu | H04W 72/56 |
| 2018/0191541 | A1* | 7/2018 | Fang | H04L 1/1864 |
| 2018/0192372 | A1* | 7/2018 | Park | H04W 52/0229 |
| 2018/0199215 | A1* | 7/2018 | Patil | H04W 52/0225 |
| 2018/0206274 | A1* | 7/2018 | Cherian | H04B 7/0417 |
| 2018/0212738 | A1* | 7/2018 | Chun | H04L 1/1685 |
| 2018/0213411 | A1* | 7/2018 | Wang | H04W 72/046 |
| 2018/0213424 | A1* | 7/2018 | Du | H04W 24/00 |
| 2018/0213558 | A1* | 7/2018 | Kim | H04W 74/08 |
| 2018/0213566 | A1* | 7/2018 | Baron | H04W 72/569 |
| 2018/0213596 | A1* | 7/2018 | Ryu | H04W 74/002 |
| 2018/0220456 | A1* | 8/2018 | Kim | H04W 74/0808 |
| 2018/0227952 | A1* | 8/2018 | Kim | H04W 74/0816 |
| 2018/0242355 | A1* | 8/2018 | Lou | H04W 74/006 |
| 2018/0242394 | A1* | 8/2018 | Wong | H04L 1/00 |
| 2018/0262936 | A1* | 9/2018 | Zhou | H04W 24/10 |
| 2018/0263043 | A1* | 9/2018 | Zhou | H04W 72/12 |
| 2018/0263044 | A1* | 9/2018 | Zhou | H04W 72/12 |

(56) References Cited

U.S. PATENT DOCUMENTS

| | | | |
|---|---|---|---|
| 2018/0263045 A1* | 9/2018 | Zhou | H04W 72/12 |
| 2018/0295580 A1* | 10/2018 | Wang | H04W 74/08 |
| 2018/0302130 A1* | 10/2018 | Wang | H04L 1/0028 |
| 2018/0302858 A1* | 10/2018 | Son | H04W 74/08 |
| 2018/0302862 A1* | 10/2018 | Takata | H04W 52/262 |
| 2018/0310330 A1* | 10/2018 | Chun | H04L 5/0091 |
| 2018/0310338 A1* | 10/2018 | Li | H04L 5/0094 |
| 2018/0317128 A1* | 11/2018 | Chun | H04L 5/0055 |
| 2018/0317235 A1* | 11/2018 | Park | H04W 28/0278 |
| 2018/0317242 A1* | 11/2018 | Park | H04W 74/085 |
| 2018/0323837 A1* | 11/2018 | Park | H04L 25/02 |
| 2018/0324859 A1* | 11/2018 | Kim | H04W 74/0816 |
| 2018/0338325 A1* | 11/2018 | Ryu | H04W 72/23 |
| 2018/0359761 A1* | 12/2018 | Chun | H04W 72/21 |
| 2018/0359807 A1* | 12/2018 | Kim | H04W 72/0446 |
| 2018/0376423 A1* | 12/2018 | Atefi | H04W 74/0808 |
| 2018/0376460 A1* | 12/2018 | Atefi | H04W 72/046 |
| 2019/0036583 A1* | 1/2019 | Cherian | H04L 5/0035 |
| 2019/0215132 A1* | 7/2019 | Malisetty | H04W 72/541 |
| 2020/0396742 A1* | 12/2020 | Park | H04L 1/1614 |
| 2020/0396743 A1* | 12/2020 | Park | H04L 5/14 |
| 2021/0006444 A1* | 1/2021 | Jang | H04W 72/0446 |
| 2021/0028897 A1* | 1/2021 | Park | H04L 5/0094 |
| 2021/0050914 A1* | 2/2021 | Jang | H04B 7/2656 |
| 2021/0068197 A1* | 3/2021 | Kim | H04W 84/12 |
| 2021/0144766 A1* | 5/2021 | Kim | H04L 5/14 |
| 2021/0168868 A1* | 6/2021 | Jang | H04L 5/0053 |
| 2021/0176643 A1* | 6/2021 | Jang | H04W 16/10 |
| 2021/0195622 A1* | 6/2021 | Kim | H04W 72/0453 |
| 2021/0204299 A1* | 7/2021 | Yun | H04W 72/542 |
| 2021/0235448 A1* | 7/2021 | Ko | H04W 72/0453 |
| 2021/0242998 A1* | 8/2021 | Park | H04L 5/0092 |
| 2021/0243756 A1* | 8/2021 | Kim | H04W 52/365 |
| 2021/0250125 A1* | 8/2021 | Park | H04L 27/2603 |
| 2021/0250133 A1* | 8/2021 | Chun | H04L 1/00 |
| 2021/0274484 A1* | 9/2021 | Park | H04W 72/0453 |
| 2021/0281376 A1* | 9/2021 | Park | H04L 5/0044 |
| 2021/0307064 A1* | 9/2021 | Ryu | H04W 74/0808 |
| 2021/0320754 A1* | 10/2021 | Yun | H04L 27/261 |
| 2021/0320830 A1* | 10/2021 | Park | H04L 27/2618 |
| 2021/0328741 A1* | 10/2021 | Jang | H04L 27/2666 |
| 2021/0329547 A1* | 10/2021 | Kim | H04W 52/0229 |
| 2021/0329721 A1* | 10/2021 | Kim | H04W 76/15 |
| 2021/0336827 A1* | 10/2021 | Park | H04L 1/0069 |
| 2021/0360525 A1* | 11/2021 | Park | H04W 72/1268 |
| 2021/0385830 A1* | 12/2021 | Lim | H04L 5/0023 |
| 2021/0391947 A1* | 12/2021 | Jang | H04W 74/0808 |
| 2021/0392647 A1* | 12/2021 | Park | H04W 72/53 |
| 2022/0014237 A1* | 1/2022 | Lopez-Perez | H04B 7/0626 |
| 2022/0021569 A1* | 1/2022 | Park | H04J 13/00 |
| 2022/0038140 A1* | 2/2022 | Lopez-Perez | H04B 7/026 |
| 2022/0038315 A1* | 2/2022 | Park | H04L 27/26132 |
| 2022/0038317 A1* | 2/2022 | Lim | H04L 25/0228 |
| 2022/0053559 A1* | 2/2022 | Jang | H04W 74/0816 |
| 2022/0103408 A1* | 3/2022 | Park | H04L 5/0051 |

FOREIGN PATENT DOCUMENTS

| | | | | |
|---|---|---|---|---|
| CN | 107852705 A | | 3/2018 | |
| CN | 108141261 A | | 6/2018 | |
| CN | 110214422 A | * | 9/2019 | H04B 7/024 |
| CN | 110234150 A | * | 9/2019 | H04W 72/21 |
| CN | 110383704 A | * | 10/2019 | H04B 17/373 |
| CN | 110392985 A | * | 10/2019 | H04B 7/0413 |
| CN | 110392986 A | * | 10/2019 | H04L 5/006 |
| EP | 3026974 A1 | * | 6/2016 | H04W 56/001 |
| EP | 3667999 A1 | * | 6/2020 | H04W 72/21 |
| EP | 3764718 A1 | * | 1/2021 | H04W 88/08 |
| EP | 3799507 A1 | * | 3/2021 | H04W 84/12 |
| EP | 3667999 B1 | * | 8/2021 | H04W 72/21 |
| EP | 3679678 B1 | * | 10/2021 | H04L 5/0035 |
| JP | 6220908 B2 | * | 10/2017 | H04B 7/0658 |
| JP | 6273068 B2 | * | 1/2018 | H04W 28/021 |
| JP | 2018530222 A | * | 10/2018 | H04W 74/08 |
| KR | 20160004950 A | * | 1/2016 | H04W 72/0453 |
| KR | 20160045023 A | * | 4/2016 | H04W 74/04 |
| KR | 20160060579 A | * | 5/2016 | H04B 15/02 |
| KR | 20160060585 A | * | 5/2016 | H04B 15/02 |
| KR | 20160102911 A | * | 8/2016 | H04W 74/008 |
| WO | WO-2016011918 A1 | * | 1/2016 | H04B 7/024 |
| WO | WO-2018136254 A1 | * | 7/2018 | H04B 7/024 |

OTHER PUBLICATIONS

Vermani et al., "16 Spatial Stream Support in Next Generation WLAN", Doc: IEEE 802.11-18/0818r3, Qualcomm, May 7, 2018, pp. 1-11.

Yang et al., "Next Generation PHY/MAC in Sub-7GHZ", doc.: IEEE 802.11-18/0846r2, Huawei, et al., May 10, 2018, pp. 1-21.

"Part 11: Wireless LAN Medium Access Control (MAC) and Physical Layer (PHY) Specifications Amendment 1: Enhancements for High Efficiency WLAN", Draft Standard for Information technology—Telecommunications and information exchange between systems Local and metropolitan area networks—Specific requirements, IEEE P802.11ax™/D3.2, Oct. 2018, pp. 1-698.

International Search Report and Written Opinion received for corresponding Patent Cooperation Treaty Application No. PCT/FI2019/050019, dated Aug. 2, 2019, 16 pages.

Office action received for corresponding Chinese Patent Application No. 201980088366.X, dated Mar. 29, 2024, 11 pages of office action and No. page of translation available.

Office action received for corresponding Chinese Patent Application No. 201980088366.X, dated Jul. 12, 2024, 4 pages of office action and No. page of translation available.

Office action received for corresponding Chinese Patent Application No. 201980088366.X, dated Sep. 26, 2023, 14 pages of office action and No. page of translation available.

Office action received for corresponding European Patent Application No. 19701268.5, dated Sep. 26, 2023, 12 pages.

* cited by examiner

COOPERATIVE BEAMFORMING IN WIRELESS NETWORK

RELATED APPLICATION

This application was originally filed as PCT Application No. PCT/FI2019/050019 on 11 Jan. 2019 which is incorporated herein by reference in its entirety.

FIELD

Various embodiments described herein relate to the field of wireless communications and, particularly, to performing beamforming transmissions in a wireless network.

BACKGROUND

Constant demand of higher throughput and capacity and density of various wireless networks sets a demand for improving spectral efficiency. Beamforming is a technique where a transmitter focuses radio energy towards an intended recipient and/or reduces radio energy towards an unintended recipient. The benefit may be improved link quality and/or reduced interference towards other radio receivers, as well as an improved spatial reuse.

BRIEF DESCRIPTION

Some aspects of the invention are defined by the independent claims.

Some embodiments of the invention are defined in the dependent claims.

According to an aspect, there is provided an apparatus for a first wireless network, comprising means for performing: establishing inter-network beamforming with an access node of a second wireless network and acquiring, during the establishment, information indicating that at least one station of the second wireless network has added an identifier of the apparatus to a beamforming address set; transmitting an announcement frame indicating the at least one station of the second wireless network; transmitting a channel sounding signal; receiving a beamforming report comprising channel state information from the at least one station of the second wireless network; and performing null steering beamforming transmission in the first wireless network on the basis of the received channel state information.

In an embodiment, the means are configured to perform at least the following when establishing the inter-network beamforming: transmitting an inter-network beamforming setup request to the access node, the inter-network beamforming setup request message indicating the at least one station of the second wireless network; and receiving, from the access node as a response to the inter-network beamforming setup request, an inter-network beamforming setup response message indicating that the that at least one station of the second wireless network has added an identifier of the apparatus to a beamforming address set.

In an embodiment, the inter-network beamforming setup request message comprises an identifier of the at least one station of the second wireless network.

In an embodiment, the inter-network beamforming setup response message comprises an information element indicating that the inter-network beamforming setup response message is also a further inter-network beamforming setup request message, and wherein the means are further configured to transmit, to the access node as a response to the further inter-network beamforming setup request message, a further inter-network beamforming setup response message indicating that at least one station of the first wireless network has added an identifier of the second access node to a beamforming address set.

In an embodiment, the addition of the identifier of the apparatus to the beamforming address set means that the at least one station of the second wireless network shall respond to the channel sounding signal by measuring the channel state information from the channel sounding signal and transmit the beamforming report to the apparatus.

In an embodiment, the means are further configured to transmit a beamforming report request message indicating the at least one station of the second wireless network and to receive the beamforming report from the at least one station of the second wireless network as a response to the beamforming report request message.

In an embodiment, the at least one station of the second wireless network is a subset of terminal devices of the second wireless network.

In an embodiment, the at least one station of the second wireless network that added the identifier of the apparatus to the beamforming address set forms a set of stations, and wherein the announcement frame indicates a subset of the set of stations.

In an embodiment, the means are configured to perform the null steering beamforming transmission by steering a transmission null towards the at least one station of the second wireless network.

According to another aspect, there is provided an apparatus for a first wireless network, comprising means for performing: receiving, from a first access node of the first wireless network to which the apparatus is associated, a beamforming address set update request message comprising an identifier of a second access node of a second wireless network, wherein the apparatus is in an unassociated state with the second access node; adding, in response to the beamforming address set update request message, the identifier of the second access node to a beamforming address set of the apparatus; receiving from the second access node an announcement frame indicating the apparatus; receiving a channel sounding signal from the second access node; measuring the channel sounding signal on the basis of the second access node comprised in the beamforming address set of the apparatus, and determining channel state information on the basis of the measured channel sounding signal; transmitting a beamforming report comprising the channel state information.

In an embodiment, the means are further configured to transmit a beamforming address set update response message as a response to the beamforming address set update request message, the beamforming address set update response message indicating that the apparatus has added the identifier of the second access node to the beamforming address set.

In an embodiment, the means are configured to perform said measuring and said transmitting the beamforming report while being in the unassociated state with the second access node.

In an embodiment, the announcement frame comprises an information element indicating that one or more unassociated stations are requested to measure the channel state information.

In an embodiment, the announcement frame comprises an identifier of the second access node as a transmitter address, a broadcast address as a receiver address, and an identifier of the apparatus.

In an embodiment, the means are further configured to receive a beamforming report request message from the second access node and, if the beamforming report request message indicates the apparatus, to transmit the beamforming report as a response to the beamforming report request message.

According to another aspect, there is provided an apparatus for a first wireless network, comprising means for performing: establishing inter-network beamforming with an access node of a second wireless network, wherein said establishing comprises transmitting to at least one station of the first wireless network a beamforming address set update request message comprising an identifier of the access node and further comprises transmitting, to the access node an inter-network beamforming setup message indicating that at least one station of the first wireless network has added an identifier of the access node to a beamforming address set, wherein adding the identifier of the access node to a beamforming address set means that the at least one station of the first wireless network shall measure channel state information and report the channel state information to the access node upon requested by the access node.

In an embodiment, the means are further configured to determine the at least one station on the basis of a criterion that the at least one station has reported a signal strength of the access node above a determined threshold.

In an embodiment, the means are further configured to determine whether or not the at least one station has provided a measurement report reporting the signal strength of the access node and upon determining that the at least one station has not provided the measurement report, requesting the at least one station to measure and report the signal strength of the access node.

In an embodiment, the above-described means comprises: at least one processor; and at least one memory including computer program code, the at least one memory and computer program code configured to, with the at least one processor, cause the performance of the apparatus.

According to another aspect, there is provide a method comprising: establishing, by a first access node of a first wireless network, inter-network beamforming with a second access node of a second wireless network and acquiring, during the establishment, information indicating that at least one station of the second wireless network has added an identifier of the first access node to a beamforming address set; transmitting, by the first access node, an announcement frame indicating the at least one station of the second wireless network; transmitting, by the first access node, a channel sounding signal; receiving, by the first access node, a beamforming report comprising channel state information from the at least one station of the second wireless network; and performing, by the first access node, null steering beamforming transmission in the first wireless network on the basis of the received channel state information.

In an embodiment, said establishing the inter-network beamforming comprises: transmitting, by the first access node, an inter-network beamforming setup request to the second access node, the inter-network beamforming setup request message indicating the at least one station of the second wireless network; and receiving, by the first access node from the second access node as a response to the inter-network beamforming setup request, an inter-network beamforming setup response message indicating that the that at least one station of the second wireless network has added an identifier of the first access node to a beamforming address set.

In an embodiment, the inter-network beamforming setup request message comprises an identifier of the at least one station of the second wireless network.

In an embodiment, the inter-network beamforming setup response message comprises an information element indicating that the inter-network beamforming setup response message is also a further inter-network beamforming setup request message, and wherein the method further comprises transmitting, by the first access node to the second access node as a response to the further inter-network beamforming setup request message, a further inter-network beamforming setup response message indicating that at least one station of the first wireless network has added an identifier of the second access node to a beamforming address set.

In an embodiment, the addition of the identifier of the apparatus to the beamforming address set means that the at least one station of the second wireless network shall respond to the channel sounding signal by measuring the channel state information from the channel sounding signal and transmit the beamforming report to the first access node.

In an embodiment, the method further comprises transmitting, by the first access node, a beamforming report request message indicating the at least one station of the second wireless network and receiving the beamforming report from the at least one station of the second wireless network as a response to the beamforming report request message.

In an embodiment, the at least one station of the second wireless network is a subset of terminal devices of the second wireless network.

In an embodiment, the at least one station of the second wireless network that added the identifier of the apparatus to the beamforming address set forms a set of stations, and wherein the announcement frame indicates a subset of the set of stations.

In an embodiment, the null steering beamforming transmission is performed by steering a transmission null towards the at least one station of the second wireless network.

According to an aspect, there is provided a method comprising: receiving, by a station from a first access node of the first wireless network to which the station is associated, a beamforming address set update request message comprising an identifier of a second access node of a second wireless network, wherein the station is in an unassociated state with the second access node; adding, by the station in response to the beamforming address set update request message, the identifier of the second access node to a beamforming address set of the station; receiving, by the station from the second access node an announcement frame indicating the station; receiving, by the station, a channel sounding signal from the second access node; measuring, by the station, the channel sounding signal on the basis of the second access node comprised in the beamforming address set of the station, and determining channel state information on the basis of the measured channel sounding signal; transmitting, by the station, a beamforming report comprising the channel state information.

In an embodiment, the method further comprises transmitting, by the station, a beamforming address set update response message as a response to the beamforming address set update request message, the beamforming address set update response message indicating that the station has added the identifier of the second access node to the beamforming address set.

In an embodiment, said measuring and said transmitting the beamforming report are performed by the station while being in the unassociated state with the second access node.

In an embodiment, the announcement frame comprises an information element indicating that one or more unassociated stations are requested to measure the channel state information.

In an embodiment, the announcement frame comprises an identifier of the second access node as a transmitter address, a broadcast address as a receiver address, and an identifier of the station.

In an embodiment, the method further comprises receiving, by the station, a beamforming report request message from the second access node and, if the beamforming report request message indicates the apparatus, transmitting by the station the beamforming report as a response to the beamforming report request message.

According to an aspect, there is provided a method comprising: establishing, by a first access node of a first wireless network, inter-network beamforming with a second access node of a second wireless network, wherein said establishing comprises the first access node transmitting to at least one station of the first wireless network a beamforming address set update request message comprising an identifier of the access node and further comprises transmitting, by the first access node to the second access node an inter-network beamforming setup message indicating that at least one station of the first wireless network has added an identifier of the second access node to a beamforming address set, wherein adding the identifier of the second access node to a beamforming address set means that the at least one station of the first wireless network shall measure channel state information and report the channel state information to the second access node upon requested by the second access node.

In an embodiment, the method further comprises determining, by the first access node, the at least one station on the basis of a criterion that the at least one station has reported a signal strength of the second access node above a determined threshold.

In an embodiment, the method further comprises determining whether or not the at least one station has provided a measurement report reporting the signal strength of the second access node and upon determining that the at least one station has not provided the measurement report, requesting by the first access node the at least one station to measure and report the signal strength of the first access node.

According to another aspect, there is provided a computer program product embodied on a computer-readable medium and comprising a computer program code readable by a computer, wherein the computer program code configures the computer to carry out a computer process comprising: establishing, by a first access node of a first wireless network, inter-network beamforming with a second access node of a second wireless network, wherein said establishing comprises the first access node transmitting to at least one station of the first wireless network a beamforming address set update request message comprising an identifier of the access node and further comprises transmitting, by the first access node to the second access node an inter-network beamforming setup message indicating that at least one station of the first wireless network has added an identifier of the second access node to a beamforming address set, wherein adding the identifier of the second access node to a beamforming address set means that the at least one station of the first wireless network shall measure channel state information and report the channel state information to the second access node upon requested by the second access node.

According to another aspect, there is provided a computer program product embodied on a computer-readable medium and comprising a computer program code readable by a computer, wherein the computer program code configures the computer to carry out a computer process comprising: receiving, by a station from a first access node of the first wireless network to which the station is associated, a beamforming address set update request message comprising an identifier of a second access node of a second wireless network, wherein the station is in an unassociated state with the second access node; adding, by the station in response to the beamforming address set update request message, the identifier of the second access node to a beamforming address set of the station; receiving, by the station from the second access node an announcement frame indicating the station; receiving, by the station, a channel sounding signal from the second access node; measuring, by the station, the channel sounding signal on the basis of the second access node comprised in the beamforming address set of the station, and determining channel state information on the basis of the measured channel sounding signal; transmitting, by the station, a beamforming report comprising the channel state information.

According to another aspect, there is provided a computer program product embodied on a computer-readable medium and comprising a computer program code readable by a computer, wherein the computer program code configures the computer to carry out a computer process comprising: establishing, by a first access node of a first wireless network, inter-network beamforming with a second access node of a second wireless network and acquiring, during the establishment, information indicating that at least one station of the second wireless network has added an identifier of the first access node to a beamforming address set; transmitting, by the first access node, an announcement frame indicating the at least one station of the second wireless network; transmitting, by the first access node, a channel sounding signal; receiving, by the first access node, a beamforming report comprising channel state information from the at least one station of the second wireless network; and performing, by the first access node, null steering beamforming transmission in the first wireless network on the basis of the received channel state information.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
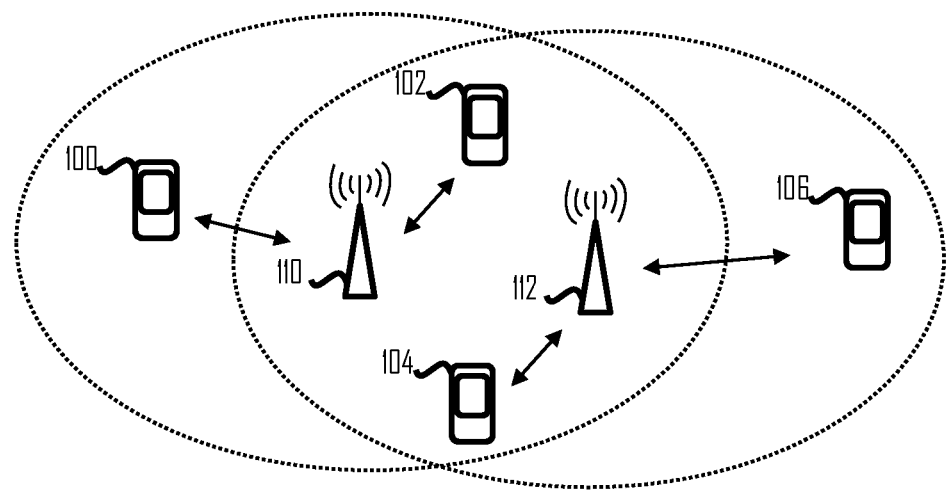

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100 to 106. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 102, 104 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11 specifications specify a data transmission mode that includes a primary channel and secondary channels. The primary channel is used in all data transmissions and, in addition to the primary channel, one or more secondary channels may be employed for additional bandwidth. The transmission band of a BSS may contain the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel.

Some IEEE 802.11 networks employ channel contention based on carrier sense multiple access with collision avoidance (CSMA/CA) for channel access. Every device attempting to gain a TXOP is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the STA gains the TXOP and starts frame transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

The STA 100 to 106 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

For the sake of the following description, let us assume a situation where the stations 100 and 102 are associated to the access node 110 while the stations 104 and 106 are associated to the access node 112. Further, the access nodes 110, 112 manage different wireless networks having different network identifiers, e.g. different SSIDs. FIG. 1 illustrates coverage areas of the respected networks. Stations 100 to 104 are located within the coverage area of the access node 110 while the stations 102 to 106 are located within the coverage area of the access node 112. Stations 104 and 102 are thus within a communication range of both access nodes 110, 112. It means that the access node 112 is a potential source of interference to the station 102 and the access node 110 is a potential source of interference to the station 104. Since the station 102 is not associated to the access node 112, overall performance of the wireless network of the access node 110 could be improved if the access node 112 reduced interference towards the station 102. The same applies to the station 104 and the wireless network of the access node 112: reduction of interference from the access node 110 towards the station 104 would improve the performance of a link between the access node 112 and the station 104.

The access nodes 110, 112 may comprise an antenna array that enables beamforming. As known in the art, beamforming or spatial filtering is a signal processing technique used for directional signal transmission or reception. The spatial filtering is achieved by combining signals in the antenna array in such a way that signals transmitted to particular angles experience constructive interference while signals transmitted to other angles experience destructive interference. Beamforming can be used at both the transmitting and receiving ends in order to achieve spatial selectivity. The improvement is directivity of radio signal to desired directions and reduction in the emitted radio energy to undesired directions.

Figure 2:
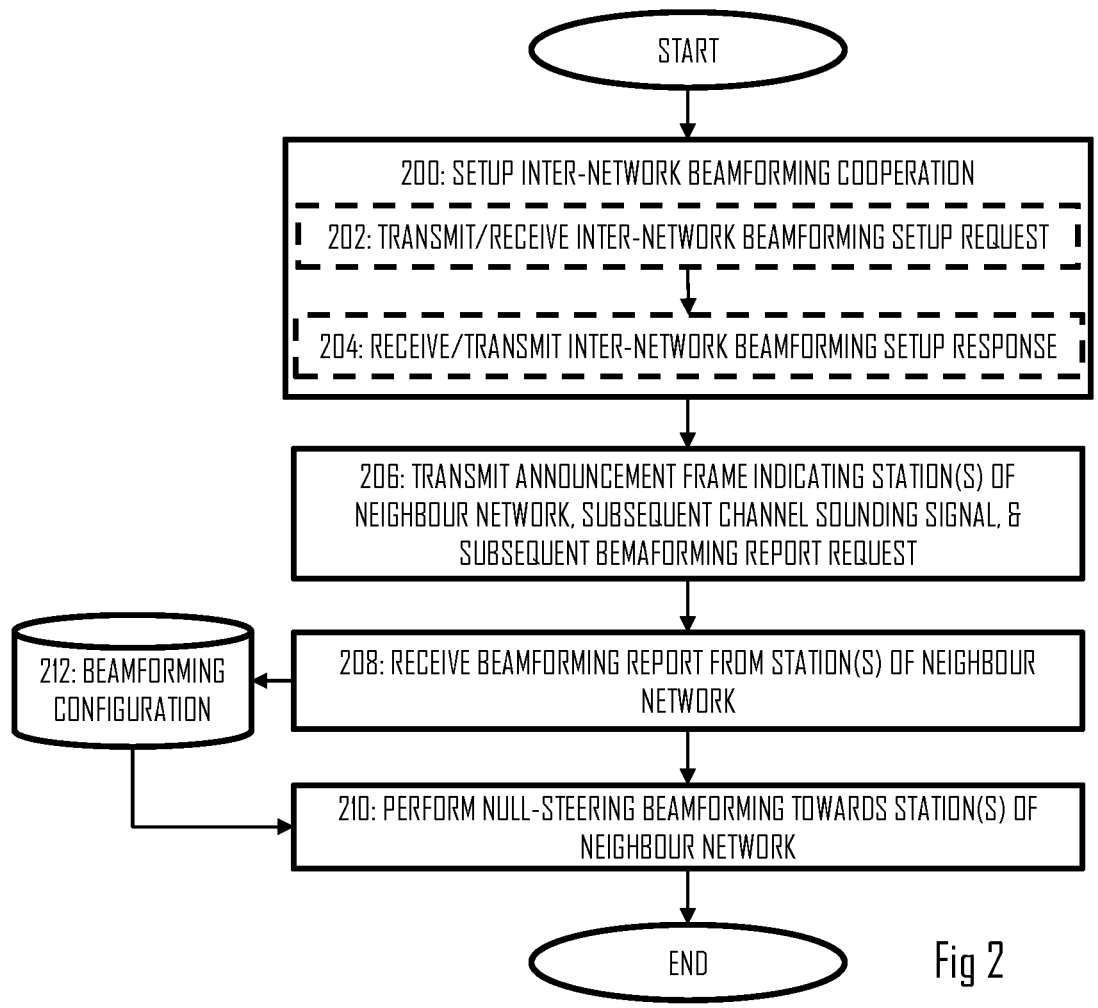
FIGS. 2 to 4 illustrate some embodiment of processes for setting up and operating inter-network beamforming cooperation.
Figure 3:
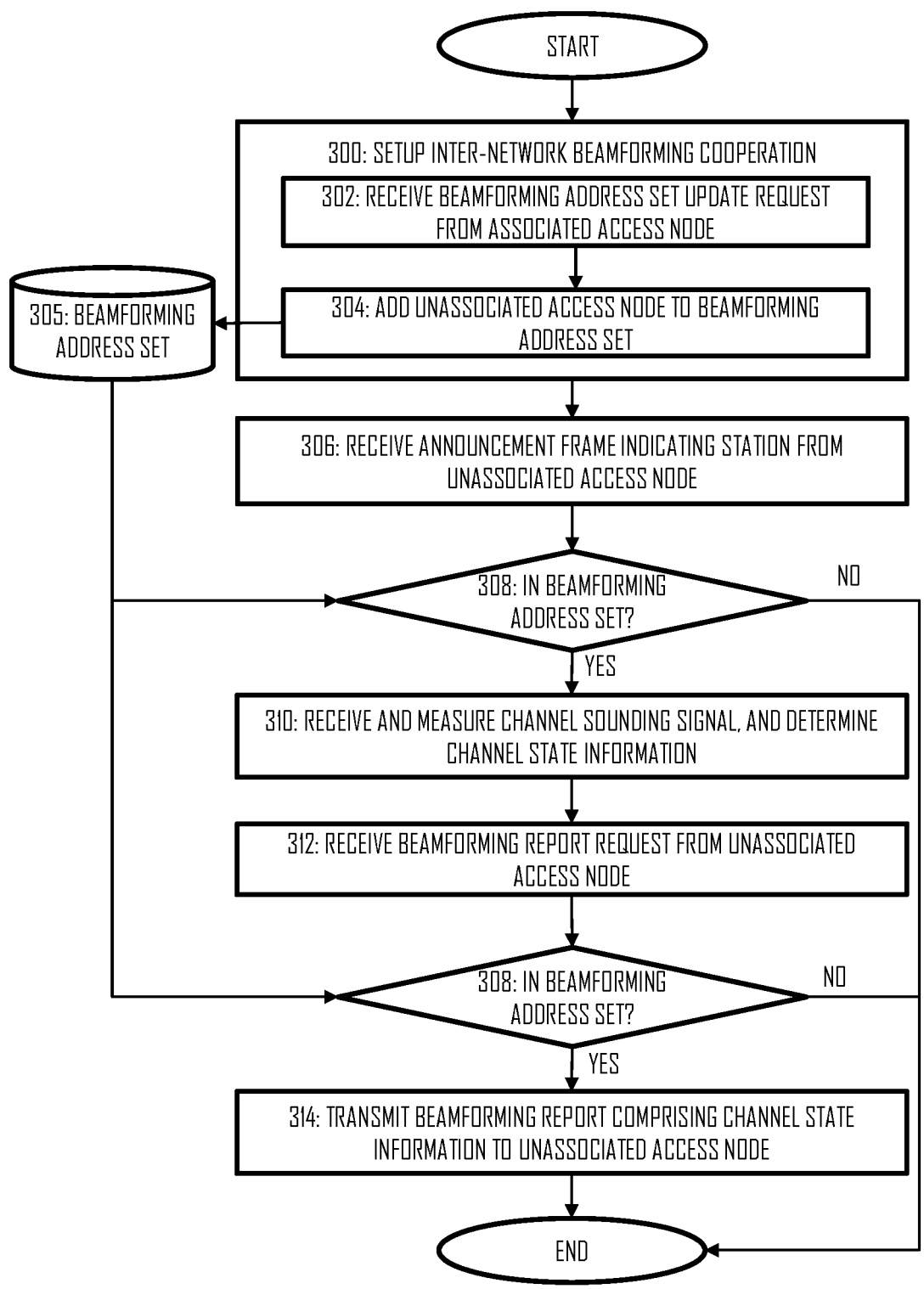
Figure 4:
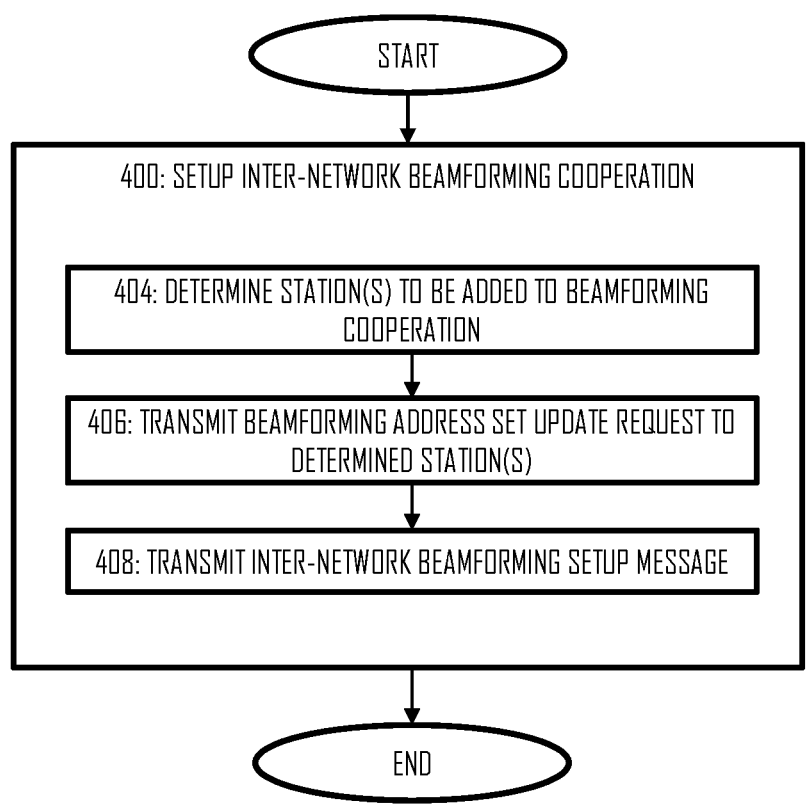

Null steering is a beamforming technique where a transmission null is directed to the undesired directions. For example, the access node 112 may try to steer a transmission null towards the station 102. Effective use of null steering would require channel state information on a radio channel between the access node 112 and the station 102. Since the station 102 is in an unassociated state with respect to the access node 112, the access node 112 may not acquire the channel state information directly from the station 102. FIGS. 2 to 4 illustrate processes according to some embodiments for performing inter-network beamforming cooperation. FIG. 2 illustrates a process executed in one of the access nodes, e.g. the access node 112, FIG. 3 illustrates a process executed in a station, e.g. the station 102, and FIG. 4 illustrates a process executed in another access node, e.g. the access node 110.

Referring to FIG. 2, the access node 112 may first setup or establish the inter-network beamforming cooperation in block 200. Block 200 comprises acquiring, during the establishment, information indicating that at least one station associated to the access node 110 has added an identifier of the access node 110 to a beamforming address set. After performing the setup in block 200, the access node 112 transmits an announcement frame indicating the at least one station, transmits a channel sounding signal, and transmits a beamforming report request in block 206. As a response to the beamforming report request message, the access node receives from the at least one station, a beamforming report comprising channel state information. The access node 112 then determines and stores a beamforming configuration 212 and performs null steering beamforming transmission in the wireless network of the access node 112 on the basis of the received channel state information (block 210). The beamforming configuration 212 may define a transmission null towards the station 102.

In an embodiment, the setup in block 200 comprises the access node 112 transmitting an inter-network beamforming setup request message to the access node 110 (block 202) and receiving, from the access node 110 as a response to the inter-network beamforming setup request message, an inter-network beamforming setup response message indicating that the at least one station of the wireless network of the access node 110 has added an identifier of the access node 112 to a beamforming address set (block 204).

In another embodiment, the setup in block 200 comprises the access node 112 receiving an inter-network beamforming setup request message from the access node 110 (block 202) to indicate that the at least one station associated to the access node 110 needs inter-network beamforming cooperation; and transmitting, to the access node 110 as a response to the inter-network beamforming setup request message, an inter-network beamforming setup response message indicating that at least one station of the wireless network of the access node 110 shall be added to the inter-network beamforming cooperation.

Referring to FIG. 3, the station 102 may also setup the inter-network beamforming configuration in block 300. In the station, the setup comprises: receiving, from the access node 110, a beamforming address set update request message comprising an identifier of the access node 112 (block 302); and adding, in response to the beamforming address set update request message, the identifier of the access node 112 to a beamforming address set 305 of the station 102 (block 304). Let us remind that the station is in an associated state with the access node 110 and in an unassociated state with the access node 112 when performing block 300.

Upon completing the setup in block 300, the station 102 receives from the access node 112 an announcement frame indicating the station 102. Since the identifier of the access node 112 is in the beamforming address set 305, the station 102 may monitor for frames comprising the identifier of the access node 112 If the identifier of the access node 112 is found in a received frame (yes in block 308), the station may extract the contents of the frame and detect that the frame is the announcement frame indicating the station 102. As a consequence, the process may proceed to block 310. Otherwise, the process may end. In block 310, the station 102 receives a channel sounding signal from the access node 112 and measures the channel sounding signal. The station 102 may then compute channel state information on the basis of the measurements.

In block 312, the station 102 receives a beamforming report request message from the access node 112. The station may perform the above-described procedure of block 308 for the newly received beamforming report request. If the beamforming report request is received from the same access node as the announcement frame in block 306, the station 102 may generate and transmit a beamforming report to the access node 112 in block 314, the beamforming report comprising the channel state information.

In an embodiment, the transmission of the beamforming report request message is omitted. In other words, the corresponding part in block 206 may be omitted as well as block 312 and subsequent block 308 are omitted. The transmission of the channel sounding signal may serve as the trigger for the transmission of the beamforming report, and all necessary information for transmitting the beamforming report may be provided in the announcement frame and in the channel sounding signal. For example, the announcement frame may indicate the station 102 and, as a consequence, the station acquires the instruction to monitor for the channel sounding signal transmitted by the access node 112. Upon detecting the channel sounding signal, the station may measure and generate the channel state information and transmit the beamforming report comprising the channel state information without a separate trigger after the channel sounding signal. An advantage of using the beamforming report request is that the access node 112 may coordinate and schedule the stations to transmit the beamforming reports. However, such a feature is not essential to the general scope of the invention.

Referring to FIG. 4, the access node 110 may participate only in the setup of the inter-network beamforming cooperation (block 400), e.g. support execution of blocks 200 and 300. The setup in block 400 comprises as performed by the access node 110: establishing the inter-network beamforming with the access node 112, wherein said establishing comprises transmitting (block 406) to the at least one station associated to the access node 110 a beamforming address set update request message comprising an identifier of the access node 112 and further comprises transmitting, to the access node 112 an inter-network beamforming setup message indicating that at least one station has added the identifier of the access node 112 to a beamforming address set, wherein adding the identifier of the access node 112 to a beamforming address set means that the at least one station shall measure channel state information and report the channel state information to the access node 112 upon requested by the access node 112. In an embodiment, the setup in block 400 comprises the access node 110 determining that the at least one station would benefit from the inter-network beamforming cooperation, e.g. that the at least one station is susceptible to interference from the access node 112 (block 404) Upon determining, the access node 110 may perform block 406 and, upon completing the beamforming address set update, transmit an inter-network beamforming setup request message to the access node 112 (block 408) to indicate that the at least one station associated to the access node 110 needs inter-network beamforming cooperation. In response, the access node 110 receives from the access node 112 an inter-network beamforming setup response message indicating that at least one station of the wireless network of the access node 110 shall be added to the inter-network beamforming cooperation.

In another embodiment, the setup in block 400 comprises the access node 110 receiving an inter-network beamforming setup request message from the access node 112 and performing block 406 as a response to the request message. Upon completing the beamforming address set update, the access node 110 may transmit, to the access node 112 as a response to the inter-network beamforming setup request message, an inter-network beamforming setup response message indicating that the at least one station of the wireless network of the access node 110 has added an identifier of the access node 112 to a beamforming address set.

In an embodiment, the station 102 adding the identifier of the access node to a beamforming address set means that the station 102 shall measure the channel state information and report the channel state information to the access node upon requested by the access node, that is perform blocks 310 and 314 as a response to blocks 306 and 312, respectively.

In an embodiment, the announcement frame is a null data packet announcement (NDPA) frame of 802.11 specifications. The NDPA frame may indicate stations from which the access node requests channel state information (CSI) and contains information on the requested CSI. In an embodiment, the announcement frame indicates at least one station from the network of the access node 112 transmitting the announcement frame and at least one station from the network of the other access node 110. Below, an example of the NDPA frame is illustrated:

| Control | Duration | RA | TA | Sounding Dialog Token | STA1 | ... | STA N | FCS |
|---------|----------|----|----|-----------------------|------|-----|-------|-----|
| 2 | 2 | 6 | 6 | 1 | 4 | | 4 | 4 |

The number below each item represents the length of the respective item in octets. Frame Control field specifies the type of the frame, and Duration field specifies the duration of the frame. RA is a receiver address, and TA is a transmitter address. The RA may be a medium access control (MAC) address of a target STA in case of unicast transmission, or it may be a broadcast address. When the frame is targeted only to the stations associated to the access node 112, the TA may be a MAC address of the access node 112. When the frame is targeted to one or more unassociated stations, the TA field may comprise a SSID of the access node 112, i.e. an identifier of the wireless network of the access node 112. Alternatively, the TA field may comprise the MAC address of the access node 112 when the frame is targeted to one or more unassociated stations. The Sounding Dialog Token may announce that the frame is a high-efficiency (HE) NDPA frame. The STA1 to STA N fields may identify the N stations that are requested to perform the channel sounding measurements, i.e. to execute block 310. The stations may comprises stations associated to the access node 112 and/or stations not associated to the access node 112. The table below illustrates an embodiment of contents of the field STA N. Frame Check Sequence (FCS) may be used for error detection/correction.

| AID11 | Partial BW Information | Feedback Type & Ng | Disambiguation | Codebook Size | Nc |
|-------|------------------------|--------------------|----------------|---------------|----|
| 11 | 14 | 2 | 1 | 1 | 3 |

The number below each item represents the length of the respective item in bits. AID11 contains the least significant bits of an association identifier of the station identified by the field. In this case, 11 least significant bits is used but the number of bits may be different. In another embodiment, the determined number of bits of the association identifier of a station may be combined with an SSID of the access node 110 to which the station is associated so that the identification is globally unique and unambiguous. Partial bandwidth (BW) information field may be used to specify a measurement band in terms of resource units. Disambiguation bit may be set to value '1' for a HE frame. The Feedback Type & Ng and Codebook size sub-fields define the type of channel state information to be determined in block 310, such as quantization resolution, single-user/multi-user feedback type, and precoding codebook size.

In an embodiment, the channel sounding signal is a null data packet (NDP) of 802.11 specifications. In an embodiment where the announcement frame is the NDPA frame and the channel sounding signal the NDP, the NDP may be transmitted a short inter-frame space (SIFS) after the NDPA frame. The NDP may carry no payload, i.e. no data field. It may yet comprise training sequence fields to enable the measurements in block 310 and, additionally, one or more signalling fields.

In an embodiment, the beamforming report request is a beamforming report poll (BFRP) trigger frame of 802.11 specifications. In an embodiment where the announcement frame is the NDPA frame, the channel sounding signal is the NDP, and the beamforming report request is the BFRP trigger frame, the access node 112 may transmit the BFRP trigger frame the SIFS after the NDP. The station 102 may then execute block 314 after the SIFS has expired from the reception of the BFRP trigger frame. The channel contention described above may be used for the transmission of the beamforming report.

As described above, the at least one station of the wireless network of the access node 110 may form a subset of stations of the second wireless network, e.g. a subset of terminal devices served by the access node 110. For example, the station 100 not within the coverage area of the access node 112 may be omitted from the inter-network beamforming cooperation. One or more stations within the coverage area of the access node 112 may equally be omitted for various reasons, e.g. low batter status.

Figure 5:
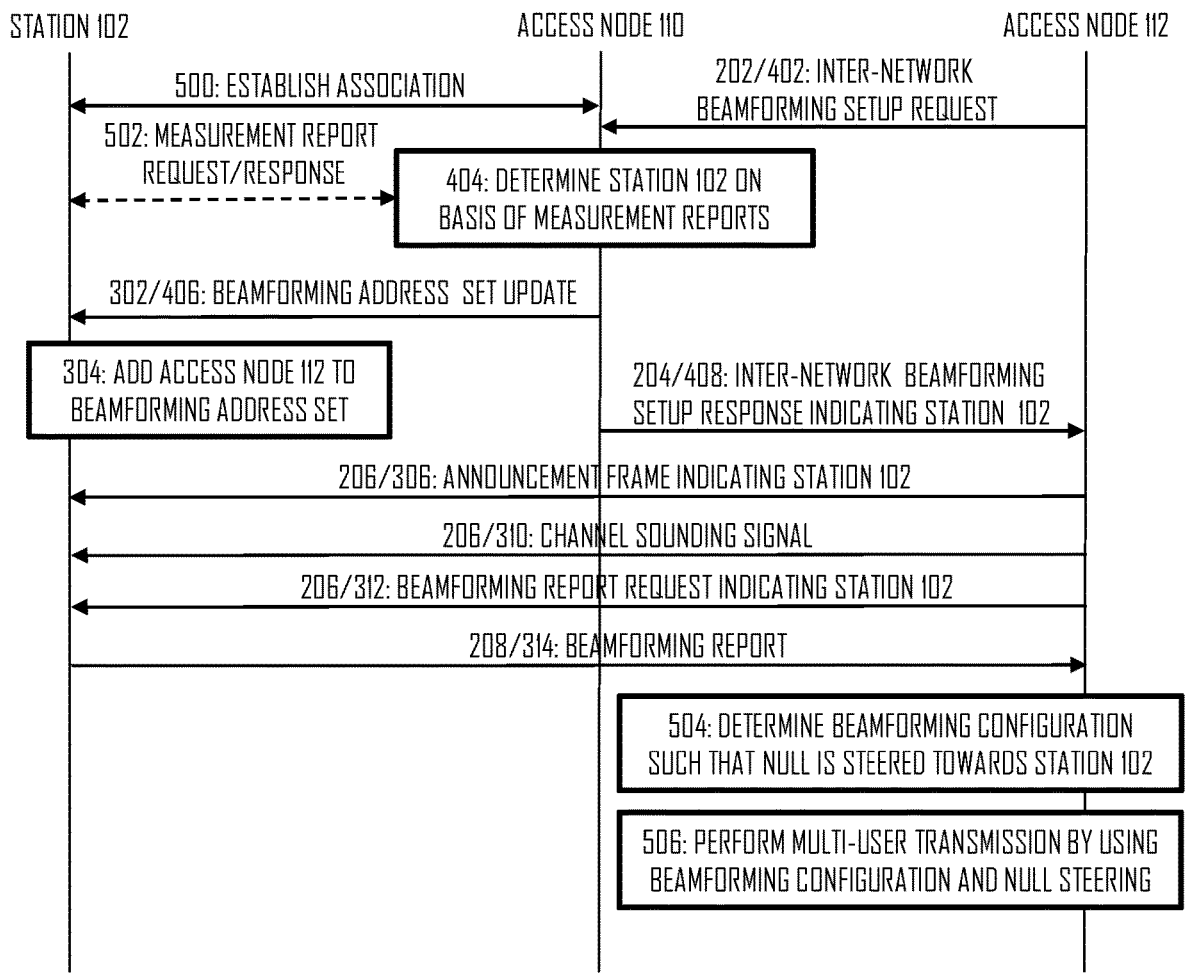
FIGS. 5 and 6 illustrate signalling diagrams according to some embodiments of the inter-network beamforming cooperation.
Figure 6:
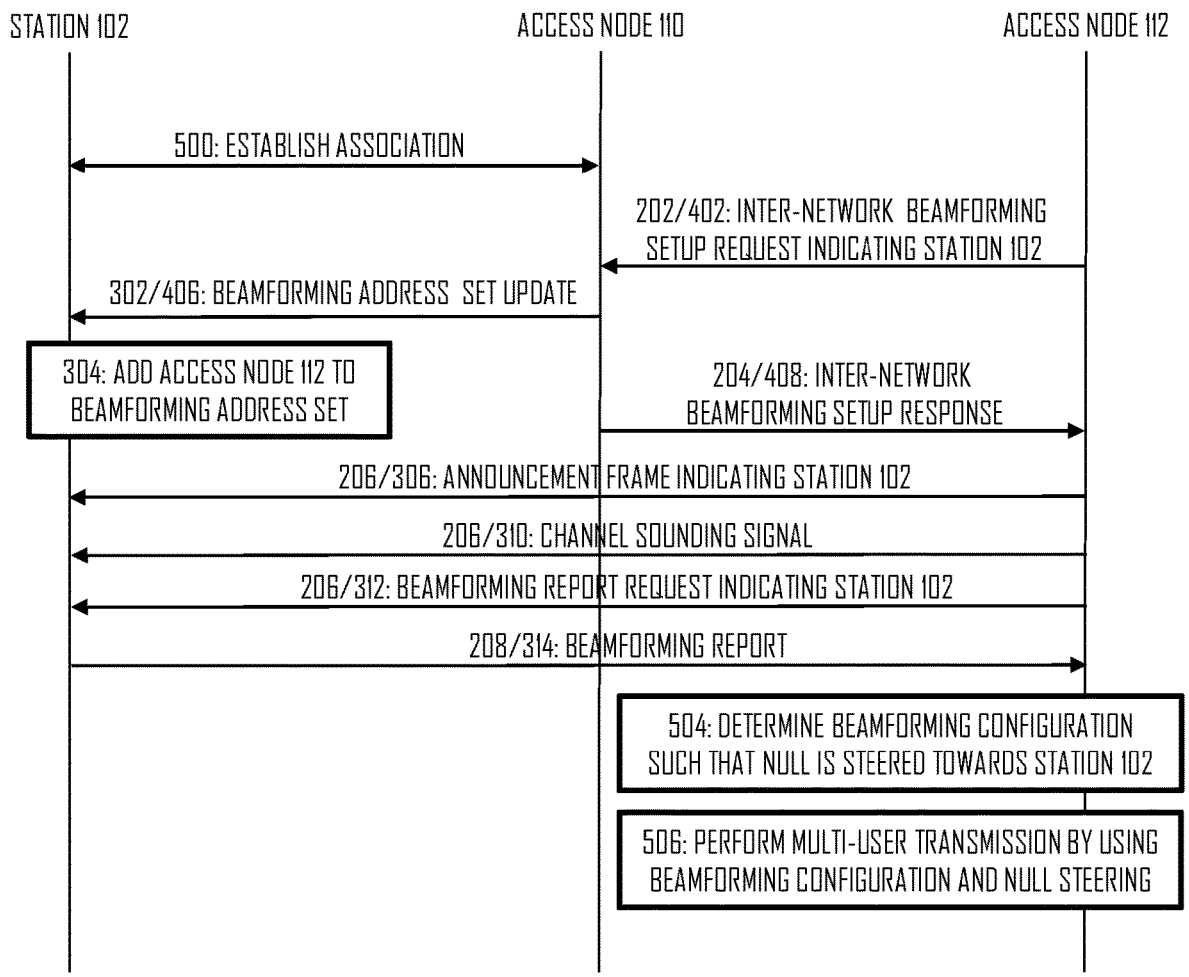

FIGS. 5 and 6 illustrate signalling diagrams combining the embodiments of FIGS. 2 to 4, i.e. illustrating the cooperative setup and execution of the inter-network beamforming cooperation. Referring to FIG. 5, the station 102 may associate to the access node 110 in step 500 in the above-described manner. The access node 112 may transmit the inter-network beamforming setup request to the access node 110 in step 202, and the access node 110 receives the request in step 402. The access node 110 may acknowledge the reception of the request by transmitting an ACK message.

In this embodiment, the access node 112 may indicate no station of the wireless network of the access node 110 in the request. In step 404, the access node 110 determines the station(s) to be entered to the beamforming cooperation, e.g. on the basis of measurement reports received from the stations associated to the access node 110. A criterion for entering a station to the beamforming cooperation may be that the station has reported a signal strength of the access node 112 above a determined threshold or a quality of connection with the access node 110 below a determined threshold. The access node 110 may thus use the signal strengths and/or quality and the threshold as a measure of whether or not a particular station is within a coverage area of the access node 112. If the access node 110 determines that a measurement report from a station is not available or has expired, the access node may request the station to send the measurement report in step 502. Upon receiving the request in step 502, the station may measure a beacon signal or another signal received from detected access nodes and send the measurement report. If the measurement report does not indicate a signal strength of the access node 112 or reports the signal strength of the access node 112 below the threshold, the station may be omitted from the beamforming cooperation with the access node. Let us, however, assume that the signal strength reported by the station 102 is above the threshold and, as a consequence, the access node 110 selects the station to the beamforming cooperation with the access node.

In step 406, the access node 110 transmits the beamforming address set update request to the station 102, and the station 102 receives the request in step 302. The station 102 may acknowledge the reception of the request, and execute block 304 by adding the SSID of the access node 112 to the beamforming address set. The station 102 may also decide whether or not to enter the beamforming cooperation and either acknowledge or deny entering the SSID of the access node 112 in the beamforming address set to the access node 110.

Upon selecting the station(s) and updating respective beamforming address set(s) in the respective station(s), the access node 110 may transmit the inter-network beamforming setup response message in step 408 and identify the station(s) in the response. The response may comprise, as an identifier of a station, the determined number of least significant bits of the association identifier of the station. A SSID, BSSID or the address of the access node 110 may serve as a further identifier of the station. In an embodiment, the access node 110 may insert signal strength values of the access node 112 as reported by the station(s) to the response, and the access node 112 may use the signal strength values in determining which station(s) to request to perform the channel sounding measurements. The access node 112 receives the response in step 204.

Upon determining that the station(s) of the neighbouring network(s) have been entered to the beamforming cooperation, the access node 112 may perform the channel sounding for the null steering towards such station(s). Accordingly, the access node transmits the announcement frame indication the station 102 in step 206 and, subsequently, the channel sounding signal in step 206. Upon receiving the announcement frame from the access node identified in the beamforming address set and subsequently detecting the identifier of the station 102 in the frame, the station 102 may perform the measurements on the channel sounding signal and compute the channel state information, as specified in the announcement frame. The station may determine a format of the channel state information on the basis of the announcement frame, as described above.

Upon receiving the beamforming report request indicating the station 102 from the access node 112 in step 312, the station may transmit the beamforming report comprising the channel state information to the access node 112 in step 314 in the above-described manner. Upon receiving the beamforming report in step 208 from the station 102, the access node may determine, on the basis of the channel state information comprised in the beamforming report, the beamforming configuration such that a transmission null is steered towards the station 102 (block 504). In block 506, the access node 112 carries out a (multi-user) transmission to stations associated to the access node 112 by using the beamforming configuration determined in step 504. With the help of the channel state information measured by the station 102, interference towards the station 102 is reduced during the transmission.

Above, a proactive approach has been described where the access node 112 proactively aims to reduce the interference towards the other network. Another approach is a reactive approach where the interference is detected by the access node 110 and, thus, the access node 110 initiates the inter-network beamforming cooperation. As described above, the access node 110 may initiate the inter-network beamforming setup upon detecting that the station 102 is susceptible to the interference from the access node 112. Such detection may be based on the above-described measurement reports indicating that the signal strength measured by the station 102 from the access node 112 is above the threshold. As a consequence, the access node 110 may trigger step 406 and, upon completing the beamforming address set update, transmit the inter-network beamforming request of step 202/402 to the access node 112. Upon receiving the corresponding inter-network beamforming response message from the access node 112 approving the request, the process may proceed to step 206/306.

FIG. 6 illustrates a modification of the embodiment of FIG. 5 where the access node 112 indicates one or more unassociated stations in the inter-network beamforming setup request of steps 202/402. The access node 112 may measure a signal strength of uplink transmissions of stations not associated to the access node and select one or more stations for the beamforming cooperation by using the above-described signal strength threshold. Another option for acquiring the signal strength is a measurement report reported by the unassociated station and received by the access node 112 from the access node 110. One or more unassociated stations from which a signal is received at a level above the threshold may be selected by the access node 112. Upon receiving the request in step 402, the access node 110 may transmit the beamforming address set update message of step 406 to one or more stations indicated by the access node 112 in the request, including the station 102. If all the indicated stations are entered to the beamforming cooperation, the access node 110 needs not to separately indicate the stations in the response of steps 204/408. However, if there is a difference between a set of stations indicated in the request and a set of stations entered to the beamforming cooperation, the access node 110 may specify the difference in the response. Otherwise, the process may proceed as in FIG. 5.

Figure 7:
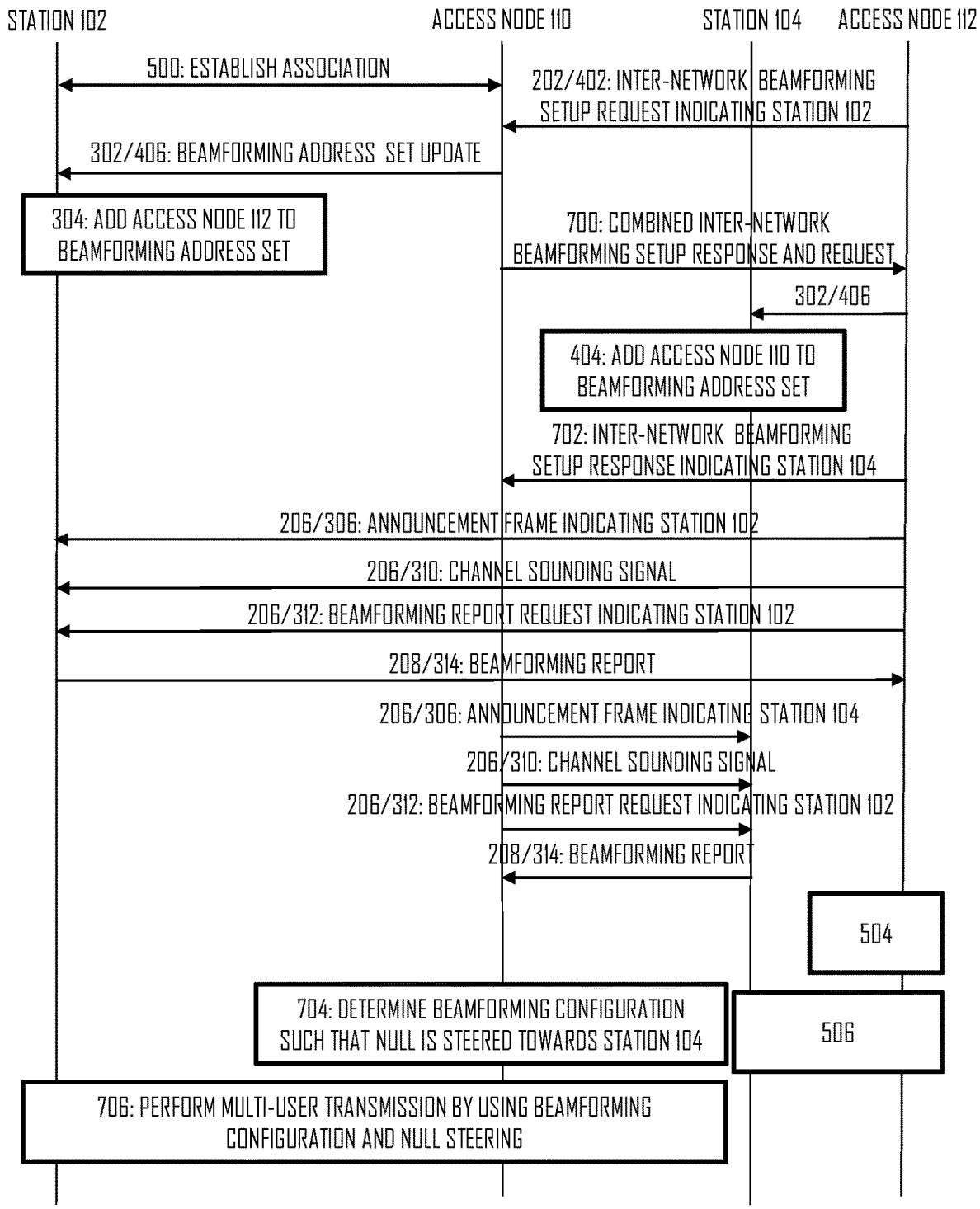
FIG. 7 illustrates bilateral setup of the inter-network beamforming cooperation according to an embodiment of the invention.

FIG. 7 illustrates an embodiment where the access nodes 110 and 112 perform bilateral setup of the beamforming cooperation. The same reference numbers as in FIGS. 5 and 6 represent the same or substantially similar operations or functions. The process may start as described above with reference to FIG. 5 or 6 with the steps 500, 202/402, 302/406, and 304. The inter-network beamforming setup response message may comprise an information element indicating whether or not the transmitter of the response (access node 110 in this case) also wants to setup the beamforming cooperation for null steering performed by the transmitter of the response (access node 110). If the information element has a value indicating that the access node 110 does not want to instantiate a further setup of the inter-network beamforming cooperation, the process may proceed, as described above in FIG. 5 or 6. However, let us now assume that the access node 110 transmits in step 700 an inter-network beamforming setup response comprising the information element indicating that the inter-network beamforming setup response message is also a further inter-network beamforming setup request message.

The message transferred in step 700 is thus a combined inter-network beamforming setup response and a request. As a consequence, the reception of the message in step 700 causes the access node to perform two functions: adding the station 102 to the list of stations towards which the null steering is performed and indicating the station in step 206; and execution of step 406 in the access node 112 where the access node requests a station 104 to add the access node 110 to a beamforming address set of the station 104. Regarding the latter function, upon entering the access node 104 to the beamforming address set of one or more stations associated to the access node 112, the access node 112 transmits an inter-network beamforming setup response message to the access node 110 in step 702, wherein the response message indicates that at least the station 104 has entered the access node 110 to the beamforming address set. In response to receiving the response message in step 702, the access node 110 may then address the station 104 in an announcement frame and a beamforming report request in step 206 performed by the access node 110. Now, both access nodes 110 and 112 have the capability of performing the null steering towards one or more stations that are not associated to the respective access nodes. For example, the access node 112 may steer a transmission null towards the station 102 in steps 504 and 506, and the access node 110 may steer a transmission null towards the station 104 in steps 704 and 706 that correspond to the steps 504 and 506, respectively.

In an embodiment, the inter-network beamforming setup may be performed for a first set of stations of the wireless network of the access node 110, and the access node 112 may indicate a subset of the first set of stations in the announcement frame. The mobility of the stations may affect the selection of the stations to be included in the subset requested to perform and report the channel sounding measurements. Various other reasons for selecting only the subset may exist.

Figure 8:
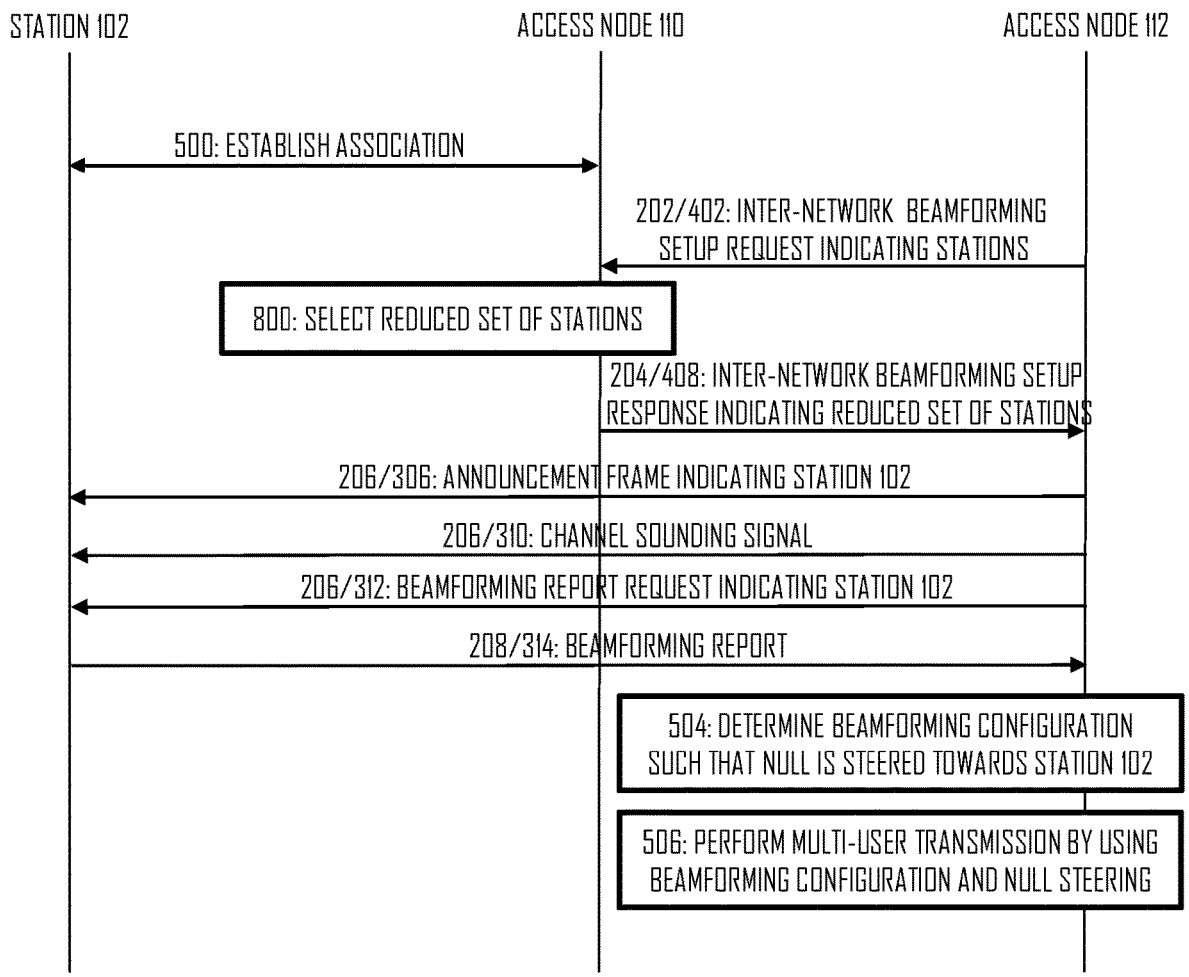
FIG. 8 illustrates a further embodiment of the inter-network beamforming cooperation.

In an embodiment, the inter-network beamforming setup request message comprises identifiers of a first set of stations of the second wireless network and the inter-network beamforming setup response message comprises a second set of stations of the second wireless network partially different from the first set of stations. FIG. 8 illustrates a procedure according to this embodiment. The same reference numbers as in previous Figures denote the same or substantially similar operations or functions as those described above. Referring to FIG. 8, the access node may request the first set of stations to be entered to the beamforming cooperation in step 202. The stations in the first set of stations may all be associated to the access node 110. Upon evaluating the measurement reports and/or upon querying the first set of stations or some of the first set of stations, the access node 110 may determine that one or more of the first set of stations shall not be entered to the beamforming cooperation. Some reasons for not entering a stations to the beamforming cooperation have been elaborated above. In block 800, the access node 110 may select a second set of stations which may be or comprise a subset of the first set of stations. The access node 110 may also propose a station not included in the first set of stations to be entered to the beamforming cooperation and included in the second set of stations. Then, the access node may indicate the second set of stations in the response message transmitted to the access node 112 in step 408. Then, the access node 112 may address the announcement frame to the second set of stations or a subset of the second set of stations.

The access node 112 may indicate in the announcement frame only stations that are associated to the access node or only stations not associated to the access node. As described above, the access node may select the transmitter address depending on whether the announcement frame indicates the associated or unassociated stations. In another embodiment, the access node 112 may indicate both stations associated and unassociated to the access node 112 in the announcement frame. In such a case, the transmitter address may be the SSID of the access node. The same may apply to the beamforming report request.

In the embodiments described above, the access nodes 110, 112 are within the communication range of one another and, thus, capable of exchanging radio frames in steps 202, 204, 402, and 408, for example. Instead of radio interface, another type of interface may be provided to enable communication between the access nodes 110, 112. The interface may be a wired interface, or the access nodes may communicate via a router or repeater. In some embodiments, the access nodes may be connected to a centralized controller that controls at least some parameters of the access nodes. Such a centralized controller may mediate the exchange of messages or control the setup of the beamforming cooperation. Such embodiments may solve a hidden station problem where the access nodes cannot directly communicate with one another but there exists a station that suffers from interference from an unassociated access node.

Figure 9:
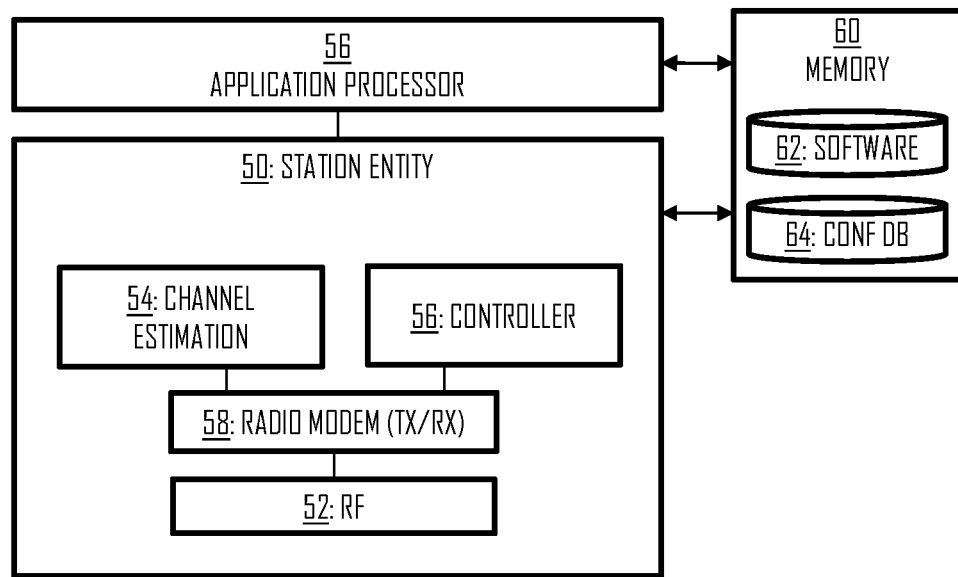
FIGS. 9 and 10 illustrate block diagrams of structures of apparatuses according to some embodiments of the invention.

FIG. 9 illustrates an embodiment of a structure of the above-mentioned functionalities of an apparatus executing the functions of the station in the process of FIG. 3 or any one of the embodiments described above for the station 102. The apparatus may be a terminal device or a client device of a wireless network, e.g. the 802.11 network. In other embodiments, the apparatus may be a circuitry or an electronic device realizing some embodiments of the invention in the wireless device. The apparatus may comply with 802.11 specifications. The apparatus may be or may be comprised in a computer (PC), a laptop, a tablet computer, a cellular phone, a palm computer, a sensor device, or any other apparatus provided with radio communication capability. In another embodiment, the apparatus carrying out the above-described functionalities is comprised in such a device, e.g. the apparatus may comprise a circuitry such as a chip, a chipset, a processor, a micro controller, or a combination of such circuitries in any one of the above-described devices. The apparatus may be an electronic device comprising electronic circuitries for realizing some embodiments of the present invention.

Referring to FIG. 9, the apparatus may comprise a station entity 50 providing the apparatus with capability of communicating in the wireless network of the access node 110. The station entity may comprise a radio interface 52 providing the apparatus with radio communication capability. The radio interface 52 may comprise radio frequency converters and components such as an amplifier, filter, frequency-converter, (de)modulator, and encoder/decoder circuitries and one or more antennas. The station entity 50 may further comprise a radio modem 58 configured to carry out transmission and reception of messages in the wireless network.

The station entity 50 may further comprise a channel estimation circuitry 54 configured to measure a signal strength from a received radio signal and to determine other channel state information such as precoding parameters. The channel estimation circuitry may be configured to execute block 310 and to generate the channel state information.

The station entity 50 may further comprise a controller 56 configured to control transmissions and functions of the station entity 50. The controller 56 may, for example, control the establishment of the association in step 500, to control the channel estimation circuitry to perform the channel estimation, and to control the radio modem to respond to the beamforming report request received from an access node to which the apparatus is not currently associated. The station entity may comprise at least one processor comprising the controller 56 and the channel estimation circuitry and, optionally, at least some of the circuitries of the radio modem 58.

The apparatus may further comprise an application processor 56 executing one or more computer program applications that generate a need to transmit and/or receive data through the station entity 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may, for example, store the beamforming address set 305.

Figure 10:
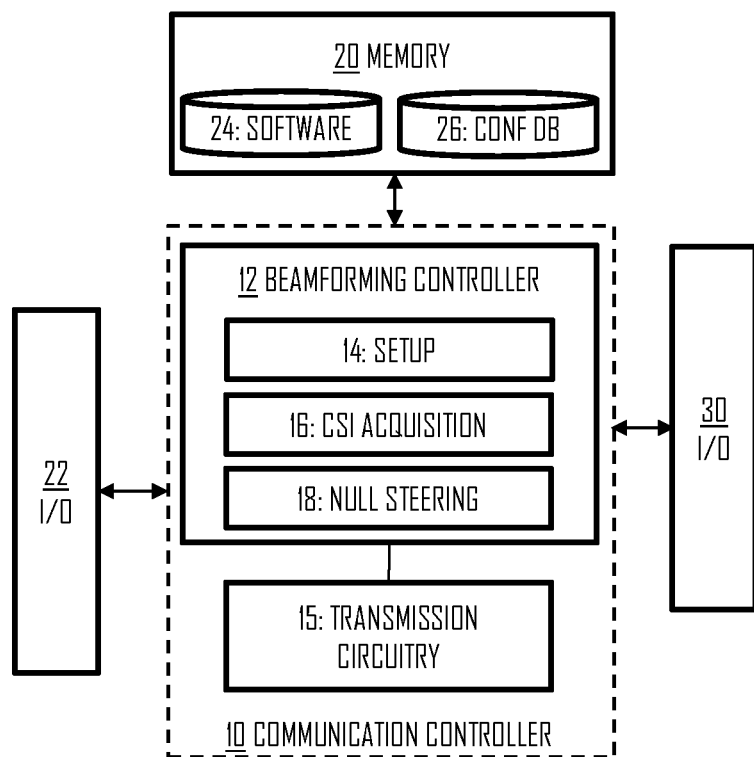

FIG. 10 illustrates an embodiment of a structure of the above-mentioned functionalities of an apparatus executing the functions of the access node in the process of FIG. 2 and/or FIG. 4 any one of the embodiment described above for the access nodes 110 and 112. The access nodes 110 and 112 may be identical and both support all the functions described above for either access node 110, 112. In another embodiment, the apparatus carrying out the above-described functionalities of the access node is comprised in such a device, e.g. the apparatus may comprise a circuitry, e.g. a chip, a chipset, a processor, a micro controller, or a combination of such circuitries in the access node. The apparatus may be an electronic device comprising electronic circuitries for realizing some embodiments of the access node.

Referring to FIG. 10, the apparatus may comprise a first communication interface 22 or a communication circuitry configured to provide the apparatus with capability for bidirectional communication with stations over a radio interface. The communication interface may comprise radio frequency circuitries for processing received control frames and data frames and control frames and data frames to be transmitted. The communication interface 22 may comprise standard well-known components such as an antenna array, amplifier, a filter, a frequency converter, and encoder/decoder circuitries.

The apparatus may further comprise a second communication interface 30 or a communication circuitry configured to provide the apparatus with capability for bidirectional communication with other access nodes and the centralized controller described above. In an embodiment, the apparatus communicates with the other access nodes through the communication interface 22 used for communication with the stations. The communication interface 30 may comprise circuitries for processing messages described above in connection with steps 202, 204 and 402, 408. The communication interface 22 may comprise standard well-known components such as an amplifier, a filter, and encoder/decoder circuitries.

The apparatus may further comprise a memory 20 storing one or more computer program products 24 configuring the operation of at least one processor 10 of the apparatus. The memory 20 may further store a configuration database 26 storing operational configurations of the apparatus, e.g. measurement reports received from the stations associated to the apparatus and the beamforming configuration 212.

The apparatus may further comprise the at least one processor 10 configured to carry out the process of FIG. 2 or any one of its embodiments, or the process of FIG. 4 or any one of its embodiments. The processor may comprise a communication controller controlling the operation of the access node. Referring to FIG. 10, the processor(s) 10 comprise(s) a beamforming controller 12 and a transmission circuitry 15. The transmission circuitry may carry out frame transmissions in a wireless network managed by the apparatus. The frame transmissions may include transmissions of frames to stations associated to the apparatus in which case the transmission circuitry may employ the beamforming configuration 212 currently stored in the configuration database 26. The frame transmissions may include the setup of the beamforming cooperation, as described above. In such a case, the transmission circuitry 15 may employ a beamforming configuration that does or does not use the null steering, e.g. omnidirectional transmission.

The beamforming controller 12 may comprise a beamforming setup circuitry 14 configured to perform the setup of the beamforming cooperation in block 200 or 400, depending on whether the apparatus is requesting the setup of the inter-network beamforming cooperation or responding to such a request. The beamforming setup circuitry may support both blocks 200 and 400. For the generation of the beamforming configuration, the beamforming controller 12 may comprise a channel state information (CSI) acquisition circuitry configured to select stations to be involved in the generation, control the transmission of the announcement frame and the beamforming report request in step 206. Upon receiving the beamforming reports from the stations, a null steering circuitry 15 may compute the beamforming configuration such that transmission null(s) is/are directed towards unassociated stations and transmission energy is directed towards associated stations. The null steering circuitry 18 may then store the beamforming configuration in the configuration database 26.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 8 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus, comprising at least one processor and at least one memory including computer program code; the at least one memory and the computer program code configured to, with the at least one processor, cause the apparatus at least to:
   transmit, from a first wireless network, an inter-network beamforming setup request to an access node of a second wireless network, the inter-network beamforming setup request message comprising an identifier of at least one station of the second wireless network;
   receive, from the access node as a response to the inter-network beamforming setup request, an inter-network beamforming setup response message indicating that the at least one station of the second wireless network has added an identifier of the apparatus to a beamforming address set;
   transmit an announcement frame indicating the at least one station of the second wireless network;
   transmit a channel sounding signal;
   receive a beamforming report comprising channel state information from the at least one station of the second wireless network; and
   perform null steering beamforming transmission in the first wireless network on the basis of the received channel state information.

2. The apparatus of claim 1, wherein the inter-network beamforming setup response message comprises an information element indicating that the inter-network beamforming setup response message is also a further inter-network beamforming setup request message, and wherein the at least one memory and the computer program code are further configured to, with the at least one processor, cause the apparatus to transmit, to the access node as a response to the further inter-network beamforming setup request message, a further inter-network beamforming setup response message indicating that at least one station of the first wireless network has added an identifier of the second access node to a beamforming address set.

3. The apparatus of claim 1, wherein the addition of the identifier of the apparatus to the beamforming address set indicates that the at least one station of the second wireless network has been configured to respond to the channel sounding signal by measuring the channel state information from the channel sounding signal and to transmit the beamforming report to the apparatus.

4. The apparatus of claim 1, wherein the at least one memory and the computer program code are further configured to, with the at least one processor, cause the apparatus to transmit a beamforming report request message indicating the at least one station of the second wireless network and to receive the beamforming report from the at least one station of the second wireless network as a response to the beamforming report request message.

5. The apparatus of claim 1, wherein the at least one station of the second wireless network is a subset of terminal devices of the second wireless network.

6. The apparatus of claim 1, wherein the at least one station of the second wireless network that added the identifier of the apparatus to the beamforming address set forms a set of stations, and wherein the announcement frame indicates a subset of the set of stations.

7. The apparatus of claim 1, wherein the at least one memory and the computer program code are further configured to, with the at least one processor, cause the apparatus to perform the null steering beamforming transmission by steering a transmission null towards the at least one station of the second wireless network.

8. An apparatus, comprising at least one processor and at least one memory including computer program code; the at least one memory and the computer program code configured to, with the at least one processor, cause the apparatus at least to:
  receive, from a first access node of a first wireless network to which the apparatus is associated, a beamforming address set update request message comprising an identifier of a second access node of a second wireless network, wherein the apparatus is in an unassociated state with the second access node;
  add, in response to the beamforming address set update request message, the identifier of the second access node to a beamforming address set of the apparatus;
  transmit a beamforming address set update response message as a response to the beamforming address set update request message, the beamforming address set update response message indicating that the apparatus has added the identifier of the second access node to the beamforming address set;
  receive from the second access node an announcement frame indicating the apparatus;
  receive a channel sounding signal from the second access node;
  measure the channel sounding signal on the basis of the second access node comprised in the beamforming address set of the apparatus,
  determine channel state information on the basis of the measured channel sounding signal; and
  transmit a beamforming report comprising the channel state information.

9. The apparatus of claim 8, wherein the at least one memory and the computer program code are further configured to, with the at least one processor, cause the apparatus to perform said measuring and said transmitting the beamforming report while being in the unassociated state with the second access node.

10. The apparatus of claim 8, wherein the announcement frame comprises an information element indicating that one or more unassociated stations are requested to measure the channel state information.

11. The apparatus of claim 8, wherein the announcement frame comprises an identifier of the second access node as a transmitter address, a broadcast address as a receiver address, and an identifier of the apparatus.

12. The apparatus of claim 8, wherein the at least one memory and the computer program code are further configured to, with the at least one processor, cause the apparatus to receive a beamforming report request message from the second access node and, in response to the beamforming report request message indicating the apparatus, to transmit the beamforming report as a response to the beamforming report request message.

13. An apparatus, comprising at least one processor and at least one memory including computer program code; the at least one memory and the computer program code configured to, with the at least one processor, cause the apparatus at least to:
  receive, in a first wireless network, an inter-network beamforming setup request from an access node of a second wireless network, the inter-network beamforming setup request message comprising an identifier of at least one station of the first wireless network;
  transmit to the at least one station of the first wireless network a beamforming address set update request message comprising an identifier of the access node; and
  transmit, to the access node an inter-network beamforming setup response message indicating that the at least one station of the first wireless network has added an identifier of the access node to a beamforming address set, wherein adding the identifier of the access node to a beamforming address set indicates that the at least one station of the first wireless network has been configured to measure channel state information and to report the channel state information to the access node upon requested by the access node.

* * * * *